United States Patent
Kawai et al.

(10) Patent No.: US 8,746,743 B2
(45) Date of Patent: Jun. 10, 2014

(54) SEAT BELT LOCKING BUCKLE AND SEAT BELT APPARATUS INCLUDING SEAT BELT LOCKING BUCKLE

(71) Applicant: Takata Corporation, Tokyo (JP)

(72) Inventors: Yoshihiko Kawai, Tokyo (JP); Den Uehara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/711,378

(22) Filed: Dec. 11, 2012

(65) Prior Publication Data

US 2013/0154334 A1    Jun. 20, 2013

(30) Foreign Application Priority Data

Dec. 14, 2011   (JP) ................................. 2011-273280

(51) Int. Cl.
*B60R 22/00*       (2006.01)

(52) U.S. Cl.
USPC ...................................................... 280/801.1

(58) Field of Classification Search
USPC .......... 280/801.1, 808; 297/468, 470; 24/637, 24/640, 641, 642
See application file for complete search history.

(56) References Cited

U.S. PATENT DOCUMENTS

| 3,555,632 | A | | 1/1971 | Lindblad |
| 3,606,454 | A | * | 9/1971 | Dorn ............................. 297/468 |
| 7,155,785 | B2 | * | 1/2007 | Muromachi ................... 24/641 |
| 2003/0071453 | A1 | | 4/2003 | Holzapfel |

FOREIGN PATENT DOCUMENTS

JP     2010-18089 A    1/2010
WO    WO 2006/132129 A1    12/2006

OTHER PUBLICATIONS

European Search Report EP Application No. 12008202.9 dated Mar. 15, 2013.

* cited by examiner

*Primary Examiner* — Faye M. Fleming
(74) *Attorney, Agent, or Firm* — Foley & Lardner LLP

(57) ABSTRACT

A seat belt locking buckle configured to allow a seat belt locking tongue to be stably and firmly latched and reduce the thickness of a seat belt locking buckle. When a tongue latch member is inserted into a seat belt locking buckle, an ejector is moved. Thus, a buckle latch member 13 becomes rotatable. Consequently, a slider moves along a plane that is parallel or substantially parallel to a plane of the motion of the tongue latch member and pushes a first latch guide portion of the buckle latch member. Thus, the buckle latch member is rotated from a non-latch position to a latch position. In this manner, the tongue latch member is latched by the buckle latch member.

13 Claims, 16 Drawing Sheets

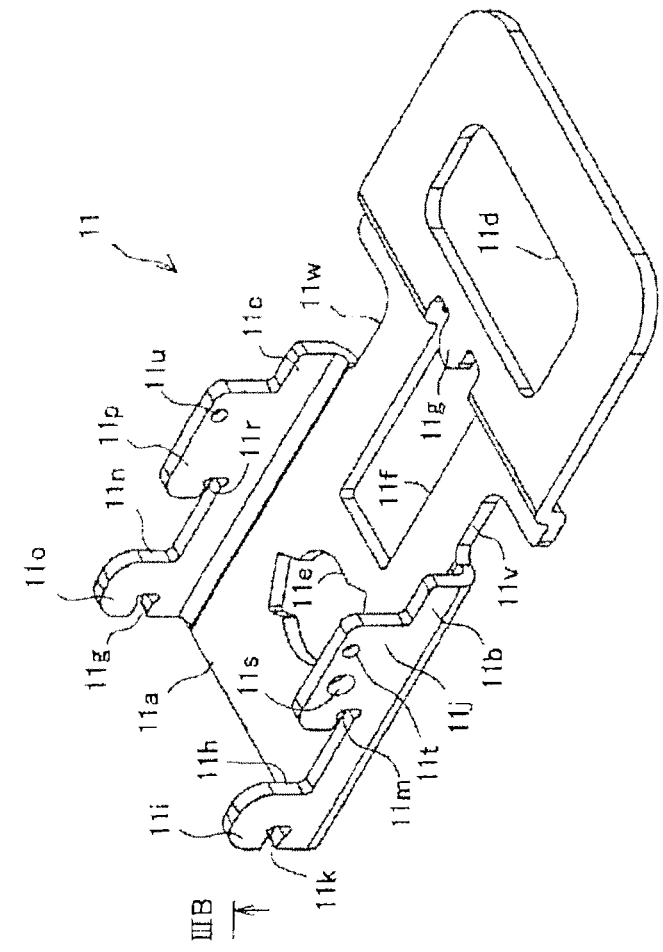
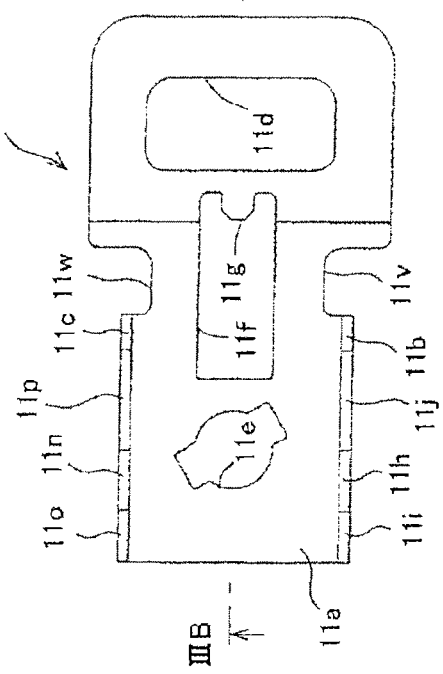
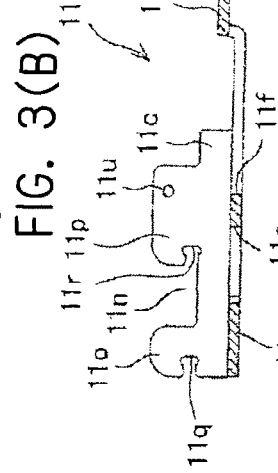
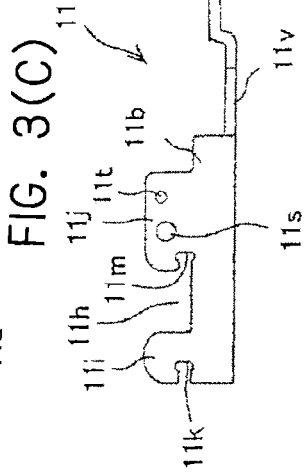

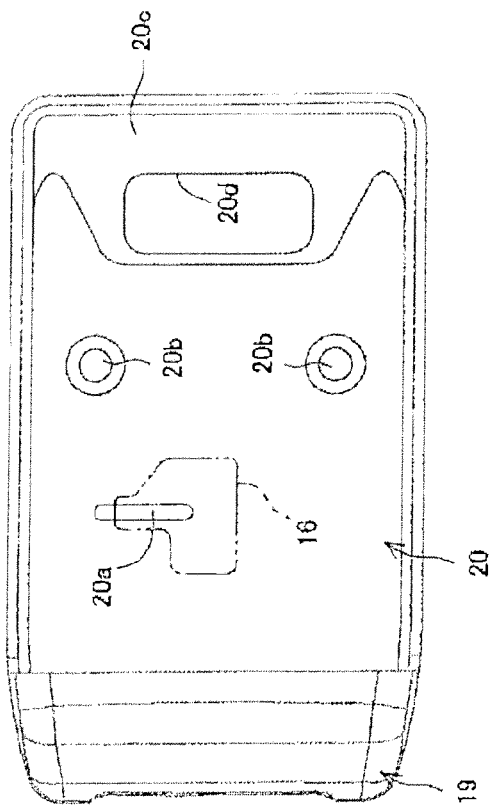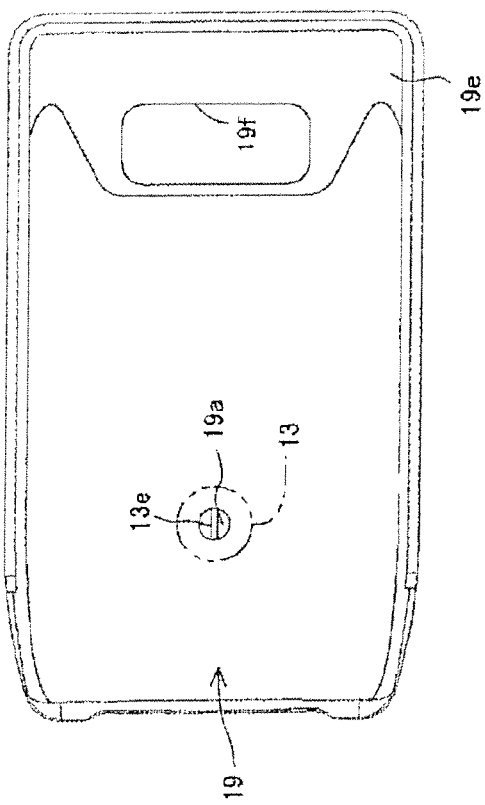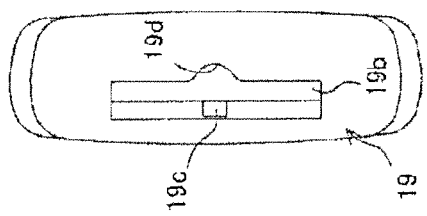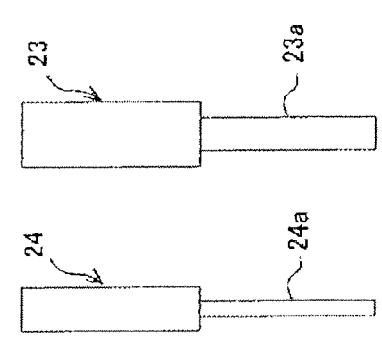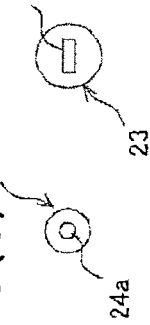

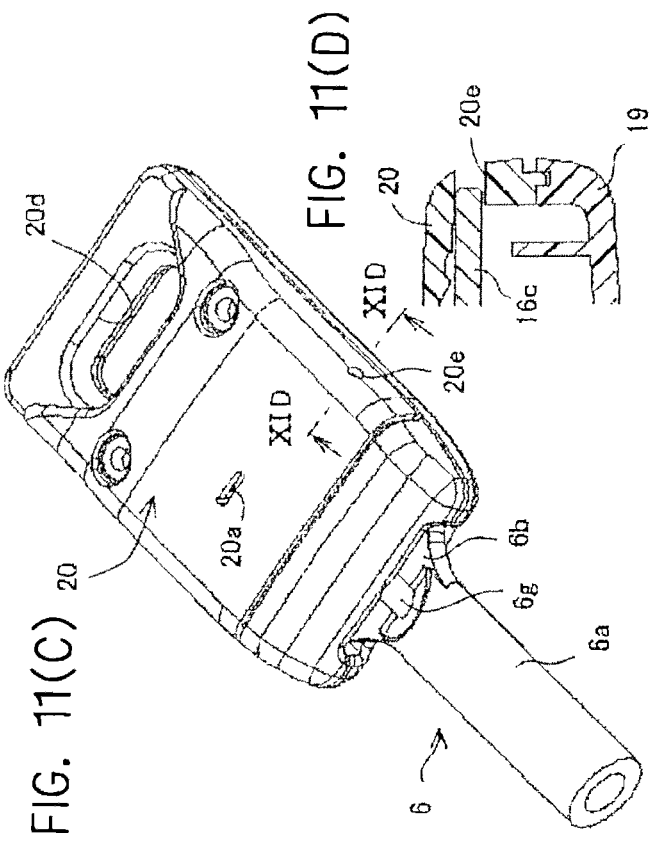
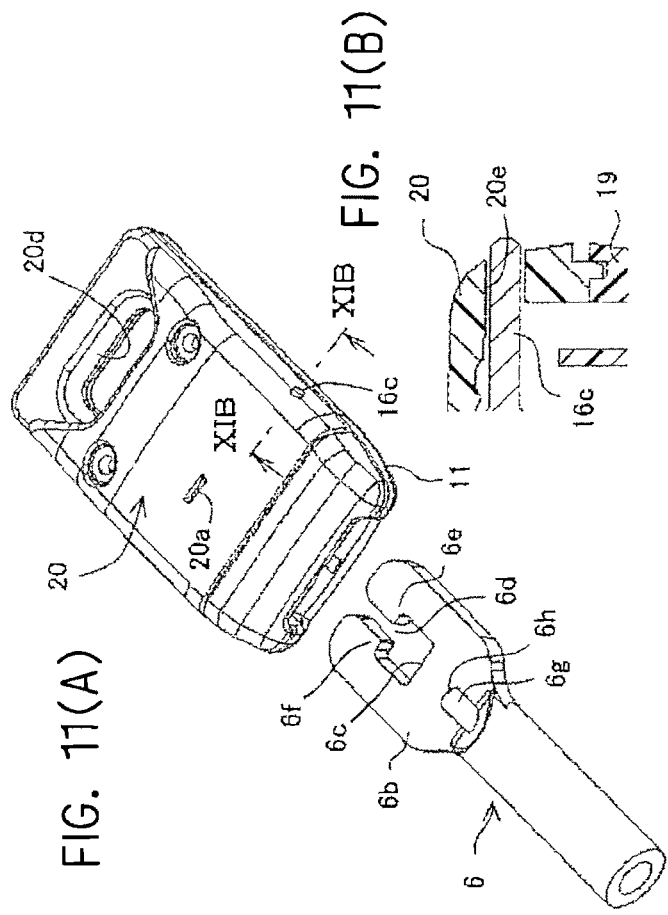

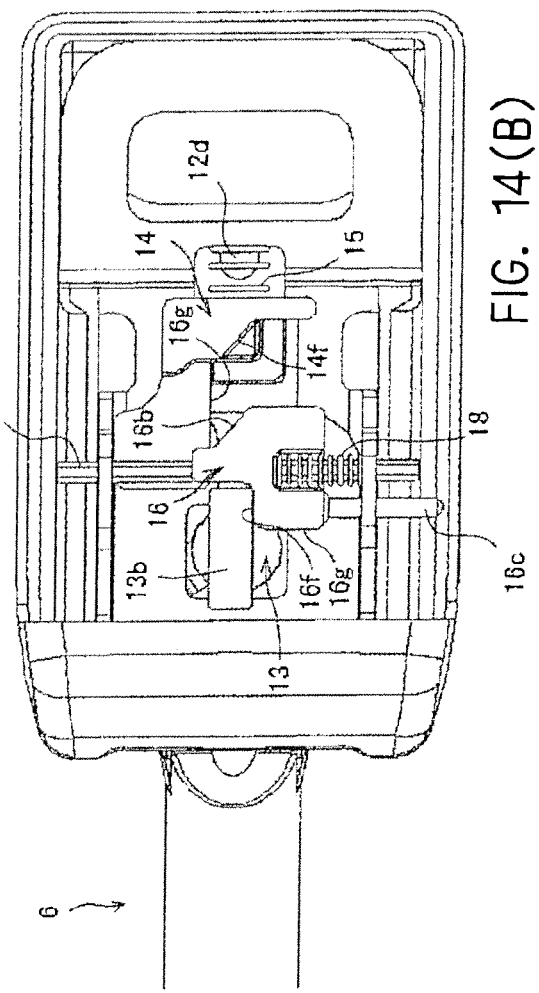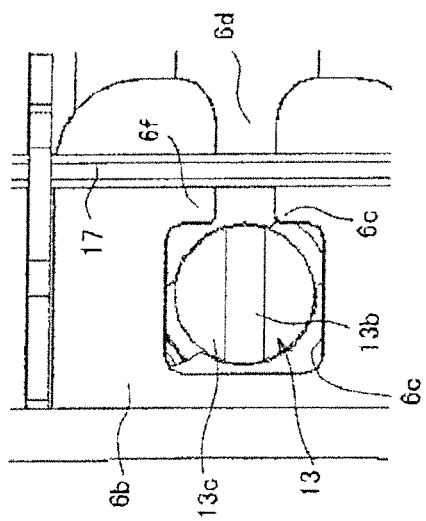

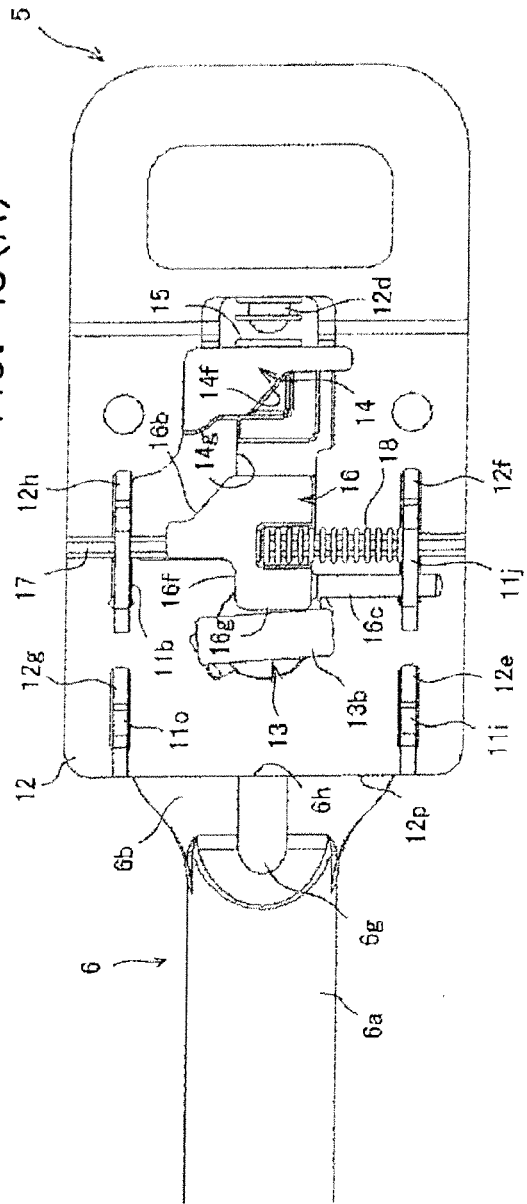
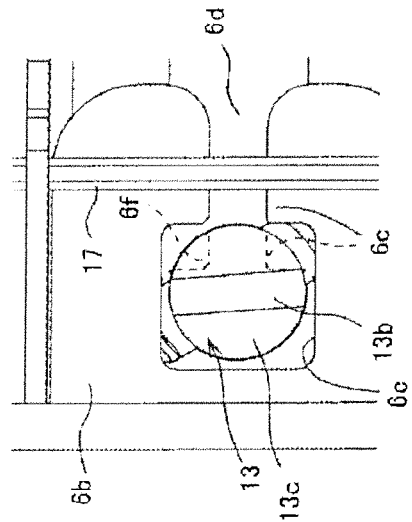

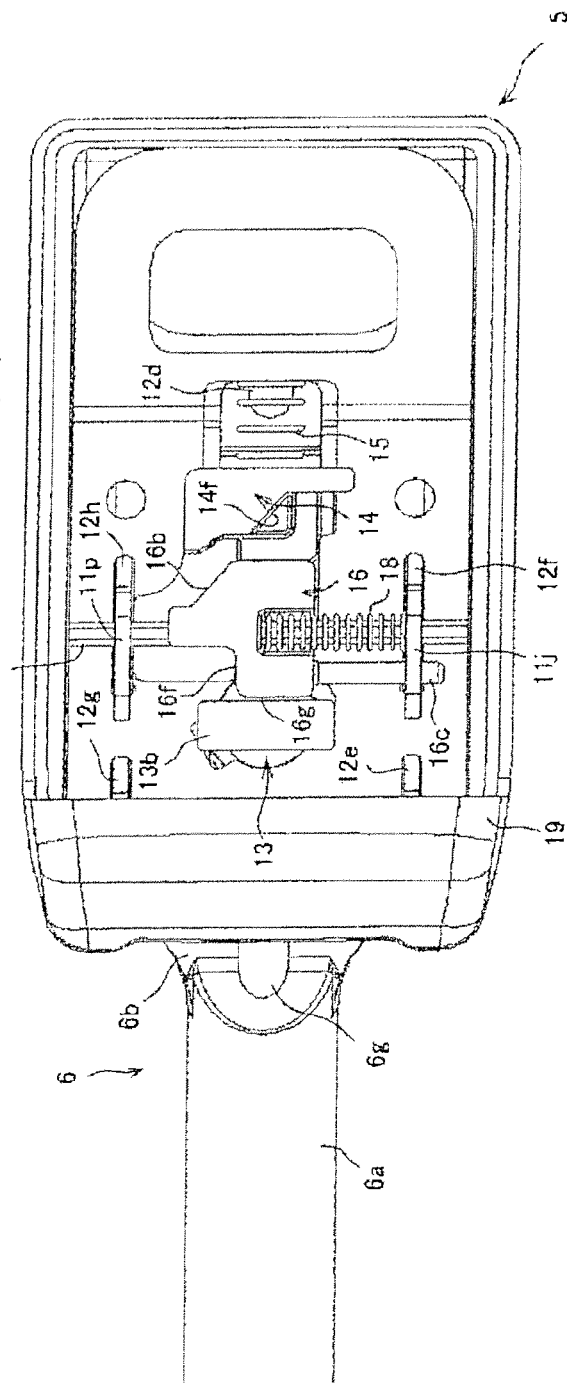
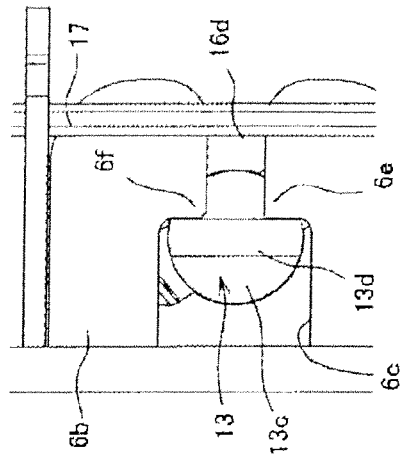

SEAT BELT LOCKING BUCKLE AND SEAT BELT APPARATUS INCLUDING SEAT BELT LOCKING BUCKLE

BACKGROUND

The present application relates to a seat belt locking buckle that fastens a top end of a seat belt to a vehicle body in order to restrain an occupant in the event of an emergency in which a deceleration greater than a normal deceleration is applied to a vehicle, such as the event of collision (hereinafter simply referred to "in the event of emergency"), and a seat belt apparatus including the seat belt locking buckle.

Seat belt apparatuses attached to a seat of a vehicle, such as an automobile vehicle, have been designed to restrain an occupant by a seat belt in the event of emergency. Examples of such seat belt apparatuses include a three-point seat belt apparatus, which has been widely known and used. In such widely known three-point seat belt apparatus, a top end of a seat belt withdrawn from a seat belt retractor is secured to a vehicle body.

To lock the top end of a seat belt to a vehicle body, a seat belt apparatus in which the top end of a seat belt is locked to the vehicle body by latching (engaging) the seat belt locking buckle provided at the top end of the seat belt with a seat belt locking tongue fixed to the vehicle body has been developed (refer to, for example, U.S. published patent application no. 2003/0071453, incorporated by reference herein).

In a seat belt apparatus according to a first embodiment described in US2003/0071453, the seat belt locking buckle includes a pair of buckle latch members each being formed in a plate shape and rotatably disposed about a pivot axis. The two buckle latch members operate in a scissors manner. In addition, the seat belt locking tongue includes a tongue latch member formed in a plate shape. When the tongue latch member is inserted into the buckle, the pair of buckle latch members latches the tongue latch member using a biasing force of a spring.

In addition, in a seat belt apparatus according to a second embodiment described in US2003/0071453, the seat belt locking buckle includes a substantially cylindrical latch member. The latch member is formed so as to extend in a direction perpendicular or substantially perpendicular to a flat movement plane located in a trajectory region in which the tongue latch member moves in the seat belt locking buckle. In addition, the latch member is disposed so as to be rotatable about an axis extending in that direction. The substantially cylindrical latch member is always and directly urged by a biasing force of a torsion spring disposed along the axis direction of the latch member so as to be rotated in a direction toward a latch position of the tongue latch member. In addition, the seat belt locking tongue includes a tongue latch member formed in a plate shape. Under a condition in which the buckle latch member is not latched by the tongue latch member, the buckle latch member is held at a non-latch position by a holding member. If the tongue latch member is inserted into the buckle to activate the holding member, the buckle latch member is rotated to the latch position by the biasing force of the torsion spring. Thus, the buckle latch member and the tongue latch member are latchable with each other.

SUMMARY

In the seat belt apparatus according to a first embodiment described in US2003/0071453, each of the buckle latch members and the tongue latch members is formed in a plate shape. Accordingly, the thickness of the seat belt locking buckle is relatively reduced. However, since the buckle latch member and the tongue latch member are latched with each other using the thicknesses thereof, it is difficult for the buckle latch member and the tongue latch member to be stably and firmly latched with each other, which is problematic.

In contrast, in the seat belt apparatus according to a second embodiment described in US2003/0071453, since the buckle latch member is formed in a cylindrical shape, the buckle latch member and the tongue latch member can be stably and firmly latched with each other. However, since the torsion spring extends along the axis direction of the buckle latch member, the thickness of the seat belt locking buckle is relatively large. In addition, since the buckle latch member is rotated by the biasing force of the torsion spring, it is difficult to smoothly rotate the buckle latch member. Furthermore, even when the buckle latch member is not latched by the tongue latch member, the buckle latch member is always and directly urged in the rotational direction. Therefore, it is difficult to assemble the buckle latch member and the torsion spring, which is problematic.

Accordingly, an object of an embodiment of the present invention is to provide a seat belt locking buckle capable of being stably and firmly latched by the seat belt locking tongue and reducing the thickness thereof and a seat belt apparatus including such a seat belt locking buckle.

In addition, another object of an embodiment of the present invention is to provide a seat belt locking buckle that allows a buckle latch member to smoothly rotate and to be easily assembled into the seat belt locking buckle and a seat belt apparatus including such a seat belt locking buckle.

To address the above-described problems, a seat belt locking buckle directly or indirectly mounted on one of a seat belt and a vehicle body is provided. The seat belt locking buckle secures a top end of the seat belt to the vehicle body by latching a seat belt locking tongue mounted directly or indirectly on the other of the seat belt and the vehicle body. The seat belt locking buckle includes a seat belt locking tongue insertion port that allows a tongue latch member of the seat belt locking tongue to be inserted into the seat belt locking buckle, a buckle latch member having a substantially solid cylindrical shape, where the buckle latch member is disposed so as to be rotatable about an axis extending in a direction perpendicular or substantially perpendicular to a plane of the motion of the tongue latch member inserted into the seat belt locking buckle through the seat belt locking tongue insertion port at least between a non-latch position at which the tongue latch member is not latchable by the buckle latch member and a latch position at which the tongue latch member is latchable by the buckle latch member, a latch member rotation control member that disables rotation of the buckle latch member and holds the buckle latch member at the non-latch position when the tongue latch member is not inserted into the seat belt locking buckle and that enables rotation of the buckle latch member when moved by the tongue latch member inserted into the seat belt locking buckle along a plane parallel or substantially parallel to the plane of the motion of the tongue latch member, and a latch-member operating member that moves along a plane parallel or substantially parallel to the plane of the motion of the tongue latch member when the buckle latch member is rotatable and pushes the buckle latch member to rotate the buckle latch member from the non-latch position to the latch position.

In addition, in the seat belt locking buckle according to a disclosed embodiment, the latch-member operating member is separated from the buckle latch member and does not push the buckle latch member when the tongue latch member is not inserted into the seat belt locking buckle. The latch-member operating member is in contact with the buckle latch member and pushes the buckle latch member when the latch member rotation control member is moved by the tongue latch member inserted into the seat belt locking buckle.

The seat belt locking buckle according to a disclosed embodiment further includes a first base and a second base. The first base and the second base are assembled together so that a space that allows the tongue latch member inserted through the seat belt locking tongue insertion port to be inserted thereinto is formed between the first base and the second base. The buckle latch member includes a first latch guide portion and a second latch guide portion by which the assembled first base and second base are sandwiched when the tongue latch member and the buckle latch member are latched together.

In addition, in the seat belt locking buckle according to a disclosed embodiment, the latch-member operating member rotates the buckle latch member from the non-latch position to the latch position by coming into contact with the first latch guide portion and pushing the first latch guide portion.

Furthermore, in the seat belt locking buckle according to a disclosed embodiment, the latch member rotation control member does not allow the latch-member operating member to be in contact with the first latch guide portion when the tongue latch member is not inserted into the seat belt locking buckle, and the latch member rotation control member causes the latch-member operating member to be in contact with the first latch guide portion when the latch member rotation control member is moved by the tongue latch member.

In addition, the seat belt locking buckle according to a disclosed embodiment further includes a cover that contains at least the buckle latch member, the latch member rotation control member, the latch-member operating member, the first base, and the second base, where the cover has the seat belt locking tongue insertion port formed therein, and a latch detection unit that protrudes from the cover to the outside of the cover when the seat belt locking tongue is not latched by the seat belt locking buckle and that retracts into the cover when the seat belt locking tongue is latched by the seat belt locking buckle.

Furthermore, in the seat belt locking buckle according to a disclosed embodiment, the latch detection unit is disposed in the latch-member operating member.

Still furthermore, the seat belt locking buckle according to a disclosed embodiment further includes an ejector that urges the tongue latch member inserted into the seat belt locking buckle in a direction in which the tongue latch member is ejected from the seat belt locking buckle, and the ejector serves as the latch member rotation control member.

In contrast, according to a disclosed embodiment, a seat belt apparatus includes a seat belt capable of restraining a vehicle occupant, a seat belt retractor that retracts the seat belt therein, a tongue slidably supported by the seat belt, a buckle that allows the tongue to be inserted thereinto and engaged therewith, a seat belt locking buckle directly or indirectly mounted on one of the seat belt and a vehicle body, and a seat belt locking tongue directly or indirectly mounted on the other of the seat belt and the vehicle body, where the seat belt locking tongue is latchable by the seat belt locking buckle. The seat belt locking buckle is the seat belt locking buckle according to any one of the above-described seat belt locking buckles.

In addition, in the seat belt apparatus according to a disclosed embodiment, the tongue latch member includes a tongue insertion regulation portion that regulates the length of a portion of the tongue latch member that is inserted into the seat belt locking buckle to a predetermined length.

Furthermore, in the seat belt apparatus according to a disclosed embodiment, the tongue insertion regulation portion further functions as a tongue latch member wrong insertion preventing portion that prevents the tongue latch member from being accidentally turned over and inserted.

Still furthermore, in the seat belt apparatus according to a disclosed embodiment, the tongue latch member includes a tongue latch member wrong insertion preventing portion that prevents the tongue latch member from being accidentally turned over and inserted.

Yet still furthermore, in the seat belt apparatus according to a disclosed embodiment, the seat belt locking buckle includes a tongue latch member wrong insertion prevention portion insertion permitting portion formed in the seat belt locking tongue insertion port, and the tongue latch member wrong insertion prevention portion insertion permitting portion allows the tongue latch member wrong insertion preventing portion to pass therethrough.

According to the seat belt locking buckle having such a structure, when the tongue latch member is not inserted into the seat belt locking buckle, rotation of the tongue latch member is disabled by the latch member rotation control member of the seat belt locking buckle and, thus, the tongue latch member is held at the non-latch position. In contrast, when the tongue latch member is inserted into the seat belt locking buckle, the latch member rotation control member is moved by the tongue latch member along a plane that is parallel or substantially parallel to a plane of the motion of the tongue latch member. Thus, rotation of the buckle latch member is enabled. In this manner, the latch-member operating member moves along a plane that is parallel or substantially parallel to a plane of the motion of the tongue latch member. Accordingly, the latch-member operating member pushes the buckle latch member so that the buckle latch member rotates about an axis that is perpendicular or substantially perpendicular to the plane of the motion of the tongue latch member from the non-latch position to the latch position. Consequently, unlike existing seat belt locking buckles, a torsion spring that is disposed along the thickness direction of the seat belt locking buckle and that urges the buckle latch member in the rotational direction need not be provided and, therefore, the thickness of the seat belt locking buckle can be reduced. In addition, since the tongue latch member is latched by the buckle latch member having a substantially solid cylindrical shape, the buckle latch member and the tongue latch member can be stably and firmly latched together.

Furthermore, when the tongue latch member is not inserted into the seat belt locking buckle, the latch-member operating member is separated from the buckle latch member and, thus, the latch-member operating member does not push the buckle latch member. In this manner, when the buckle latch member is assembled, the buckle latch member is not urged by the latch-member operating member. Consequently, the buckle latch member can be easily assembled.

Still furthermore, when the tongue latch member is inserted into the seat belt locking buckle, the assembled first base and second base are sandwiched by the first latch guide portion and the second latch guide portion of the buckle latch member. Thus, even when, in the event of emergency, a tensional force that is greater than in a normal case is exerted on the assembled first base and second base to spread the assembled first base and second base from each other, the first latch guide portion and the second latch guide portion can effectively prevent the spread of the first base and the second base. That is, the strength of the assembled first base and second base can be reinforced by the buckle latch member.

Yet still furthermore, the latch detection unit is provided. When the seat belt locking tongue is not latched by the seat belt locking buckle, the latch detection unit protrudes from the cover to the outside of the cover. In contrast, when the seat belt locking tongue is latched by the seat belt locking buckle, the latch detection unit is retracted into the cover. Thus, by visually recognizing whether the latch detection unit protrudes to the outside of the cover, an operator can determine whether the seat belt locking tongue and the seat belt locking buckle are latched together. In particular, by providing the latch detection unit in the latch-member operating member, the structure for detecting a latch condition can be simplified.

Yet still furthermore, the latch member rotation control member is formed from the ejector that urges the tongue latch member in a direction in which the tongue latch member is ejected from the seat belt locking buckle. Accordingly, the structure for latching the seat belt locking buckle can be simplified.

Yet still furthermore, according to a disclosed embodiment, the seat belt apparatus includes the seat belt locking buckle that is stably and firmly latchable with the seat belt locking tongue and that can reduce the thickness of the seat belt apparatus is provided. Thus, a vehicle occupant can be effectively restrained by using the seat belt. Furthermore, since a space occupied by the seat belt apparatus is reduced, the seat belt apparatus does not interfere with motion of the occupant in a vehicle compartment.

Yet still furthermore, according to the disclosed seat belt apparatus, the tongue insertion regulation portion is provided. By using the tongue insertion regulation portion, the length of a portion of the tongue latch member inserted into the seat belt locking buckle can be controlled to a predetermined length. Accordingly, the seat belt locking buckle and the seat belt locking tongue can be easily and stably latched together.

Yet still furthermore, according to the disclosed seat belt apparatus, the tongue latch member wrong insertion preventing portion is provided. By using the tongue latch member wrong insertion preventing portion, wrong insertion in which the tongue latch member is accidentally turned over and is inserted can be prevented. In this manner, a twisted seat belt cannot be buckled and, therefore, the vehicle occupant can be more reliably restrained. In such a case, by forming the tongue latch member wrong insertion preventing portion from the tongue insertion regulation portion, the structures of the tongue latch member wrong insertion preventing portion and the tongue insertion regulation portion can be simplified.

BRIEF DESCRIPTION OF THE DRAWINGS

FIG. 3(A) is a top view of a first base; FIG. 3(B) is a cross-sectional view taken along a line IIIB-IIIB of FIG. 3(A); FIG. 3(C) is a front view of the first base; and FIG. 3(D) is a perspective view of the first base.

FIG. 9(A) is a front view of first and second covers; FIG. 9(B) is a bottom view of the first and second covers; FIG. 9(C) is a left side view of the first and second covers; FIG. 9(D) is a front view of a latch member rotating tool for rotating a latch member; FIG. 9(E) is a bottom view of the latch member rotating tool; FIG. 9(F) is a front view of a slider moving tool for moving the slider; and FIG. 9(G) is a bottom view of the slider moving tool.

FIG. 11 illustrates visual check as to whether the seat belt locking tongue is properly latched by the seat belt locking buckle, where FIG. 11(A) is a perspective view of the seat belt locking buckle that is not latched by the seat belt locking tongue, FIG. 11(B) is a cross-sectional view taken along a line XIB-XIB of FIG. 11(A), FIG. 11(C) is a perspective view of the seat belt locking buckle that is properly latched by the seat belt locking tongue, and FIG. 11(D) is a cross-sectional view taken along a line XID-XID of FIG. 11(C).

FIG. 14(A) is a partially cut-away top view of the seat belt locking buckle with the seat belt locking tongue further inserted immediately before the latch member rotates; and FIG. 14(B) is a partially enlarged view illustrating a positional relationship between the buckle latch member and the tongue latch member.

FIG. 15(A) is a partially cut-away top view of the seat belt locking buckle after the seat belt locking tongue is further inserted and the latch member is rotated to a latch position; and FIG. 15(B) is a partially enlarged view illustrating a positional relationship between the buckle latch member and the tongue latch member.

FIG. 16(A) is a partially cut-away top view of the seat belt locking buckle when the buckle latch member and the tongue latch member are properly latched together; and FIG. 16(B) is a partially enlarged view illustrating a positional relationship between the buckle latch member and the tongue latch member.

DETAILED DESCRIPTION

Embodiments of the present invention are described below with reference to the accompanying drawings.

Figure 1:
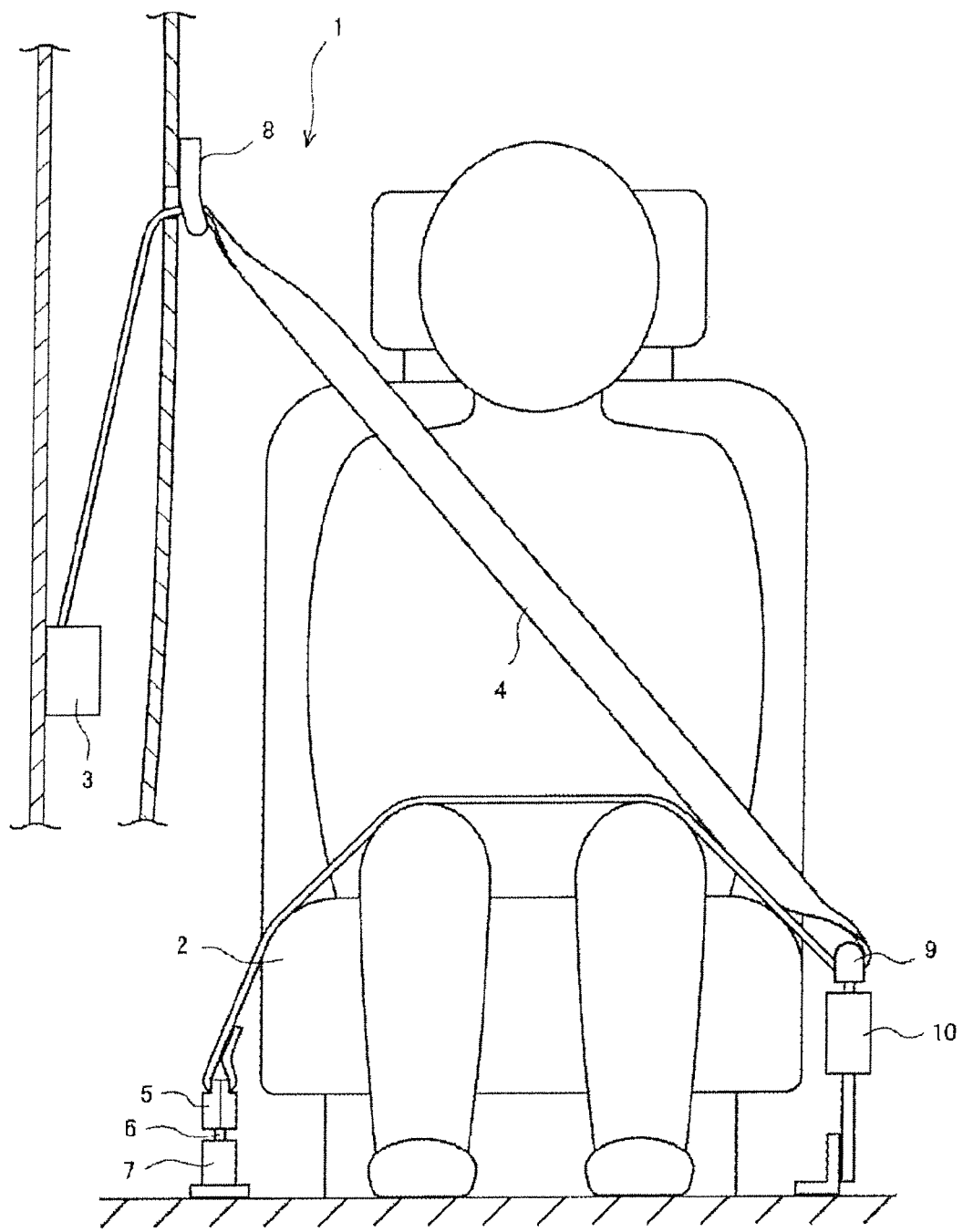
FIG. 1 is a schematic illustration of a seat belt apparatus including a seat belt locking buckle according to an embodiment of the present invention.

FIG. 1 is a schematic illustration of a seat belt apparatus including a seat belt locking buckle.

As illustrated in FIG. 1, the seat belt apparatus is basically similar to a well-known three-point seat belt apparatus. An existing structure of the seat belt apparatus according to the present embodiment is briefly described first. In FIG. 1, a reference numeral "1" denotes the seat belt apparatus, a reference numeral "2" denotes a vehicle seat, a reference numeral "3" denotes a seat belt retractor disposed on the vehicle body in the vicinity of the vehicle seat 2, a reference numeral "4" denotes a seat belt to be withdrawably retracted by the seat belt retractor 3, a reference numeral "5" denotes a seat belt locking buckle attached to a top end of the seat belt 4, a reference numeral "6" denotes a seat belt locking tongue that can be releasably latched by the seat belt locking buckle 5, a reference numeral "7" denotes a pretensioner that allows the seat belt locking tongue 6 to be attached thereto and that operates and exert a tensional force on the seat belt 4 in the event of emergency, a reference numeral "8" denotes a belt guide anchor that leads the seat belt 4 withdrawn from the seat belt retractor 3 to the shoulder of an occupant, a reference numeral "9" denotes a tongue slidably supported by the seat belt 4 lead by the belt guide anchor 8, and a reference numeral "10" denotes a buckle that is fixed to a floor of the vehicle body or the vehicle seat 2 and that allows the tongue 9 to be inserted thereinto and removably engaged therewith. Operations for fastening and unfastening the seat belt 4 of the seat belt apparatus 1 are basically the same as those in existing seat belt apparatuses.

The top end of the seat belt 4 is fixed to the vehicle body by latch-connecting the seat belt locking buckle 5 to the seat belt locking tongue 6 fixed to the vehicle body via the pretensioner 7. In addition, when the seat belt 4 is not buckled around an occupant, the tongue 9 is not latched by the buckle 10. The entire length of the seat belt 4 (more specifically, a length of the seat belt 4 that the seat belt retractor 3 can retract without any problem) is retracted into the seat belt retractor 3. In contrast, in order to buckle the seat belt 4 around an occupant, a predetermined length of the seat belt 4 is withdrawn out of the seat belt retractor 3, as illustrated in FIG. 1. In addition, the tongue 9 is engaged with the buckle 10, and slack in the seat belt 4 is removed. In this manner, the seat belt 4 is buckled around an occupant.

When the seat belt 4 is buckled around an occupant under a normal condition in which much greater deceleration than that applied to a vehicle traveling on a road is not applied to the vehicle, the seat belt 4 can be freely withdrawn out of the seat belt retractor 3 at a normal belt withdrawal speed. In addition, if the occupant releases the seat belt 4, excessive amounts of slack of the seat belt 4 is retracted into the seat belt retractor 3. Furthermore, when the seat belt 4 is buckled around an occupant in the event of emergency conditions under which a large deceleration is applied to the vehicle (e.g., in the event of collision of the vehicle), the seat belt retractor 3 locks the seat belt 4 so that withdrawal of the seat belt 4 is stopped. In this manner, the seat belt 4 restrains the occupant.

Structures of the seat belt locking buckle according to the present embodiment and the seat belt apparatus including the seat belt locking buckle that differ from existing structures are described next.

Figure 2:
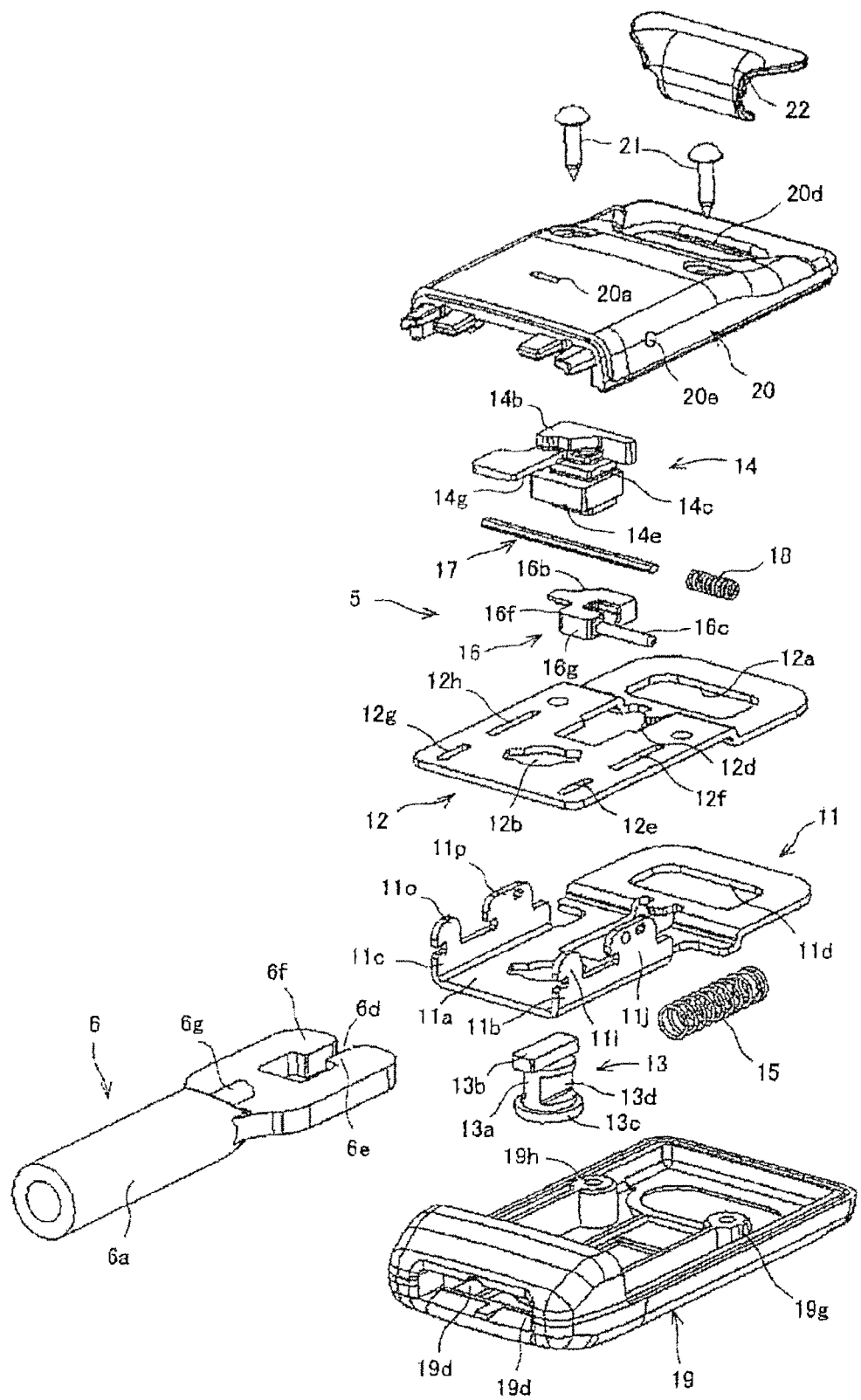
FIG. 2 is an exploded perspective view of the seat belt locking buckle and a seat belt locking tongue used in the seat belt apparatus illustrated in FIG. 1 according to an embodiment of the present invention.

FIG. 2 is an exploded perspective view of the seat belt locking buckle and the seat belt locking tongue for use in the seat belt apparatus.

As illustrated in FIG. 2, according to the present embodiment, the seat belt locking buckle 5 includes a first base 11, a second base 12, a buckle latch member 13, an ejector 14, an ejector spring 15, a slider 16, a slider guide shaft 17, a slider spring 18, a first cover 19, a second cover 20, a pair of assembling screws 21, and a sheet belt protector 22. In such a case, each of the first base 11, the second base 12, the buckle latch member 13, the ejector 14, the ejector spring 15, the slider 16, the slider guide shaft 17, the slider spring 18, and the pair of assembling screws 21 is formed from a metal material. In contrast, each of the first cover 19, the second cover 20, and the sheet belt protector 22 is formed from a synthetic resin material.

FIG. 3(A) is a top view of the first base. FIG. 3(B) is a cross-sectional view taken along a line IIIB-IIIB of FIG. 3(A). FIG. 3(C) is a front view of the first base. FIG. 3(D) is a perspective view of the first base.

As illustrated in FIGS. 3(A) to 3(D), the first base 11 includes a plate-like base portion 11a and first and second side walls 11b and 11c extending from both edges of the base portion 11a upward. The base portion 11a includes a seat belt through-hole lid that allows the seat belt 4 to pass therethrough, a latch member insertion hole 11e that allows the buckle latch member 13 to be inserted thereinto, an ejector guide hole 11f that leads the ejector 14, and an ejector spring support portion 11g that supports an end of the ejector spring 15.

The first side wall 11b has a first concave groove 11h that has a rectangular shape and that opens upward, as illustrated in FIG. 3(C). In addition, the first concave groove 11h has first and second engagement fixing portions 11i and 11j on either side thereof. The first and second engagement fixing portions 11i and 11j allow the second base 12 to be engaged therewith and fixed thereto. Furthermore, the first engagement fixing portion 11i of the first side wall 11b has a rectangular first engagement support groove 11k formed at an end thereof into which the seat belt locking tongue 6 is to be inserted (a left end portion in FIG. 3(C)). Still furthermore, the first side wall 11b has a rectangular second engagement support groove 11m such that the left end of the rectangular second engagement support groove 11m is open to the first concave groove 11h, as illustrated in FIG. 3(C). The second engagement support groove 11m is the same as the rectangular first engagement support groove 11k in shape and size.

In contrast, the second side wall 11c has a second concave groove 11n having a shape and a size that are the same as those of the first concave groove 11h. In addition, the second concave groove 11n has third and fourth engagement fixing portions 11o and 11p on either side thereof. The third and fourth engagement fixing portions 11o and 11p have shapes and sizes that are the same as those of the first and second engagement fixing portions 11i and 11j, respectively. The third and fourth engagement fixing portions 11o and 11p allow the second base 12 to be engaged therewith and fixed thereto. Furthermore, the third engagement fixing portion 11o of the second side wall 11c has a third engagement support groove 11q that has a shape and a size that are the same as those of the first engagement support groove 11k and that is formed in the same manner as the first engagement support groove 11k. Still furthermore, the second side wall 11c has a fourth engagement support groove 11r that has a shape and a size that are the same as those of the second engagement support groove 11m and that is formed in the same manner as the second engagement support groove 11m.

In such a case, the first concave groove 11h, the first and second engagement fixing portions 11i and 11j, the first engagement support groove 11k, and the second engagement support groove 11m are disposed so as to face the second concave groove 11n, the third and fourth engagement fixing portions 11o and 11p, the third engagement support groove 11q, and the fourth engagement support groove 11r, respectively, in the width direction of the first base 11 (in the up-down direction in FIG. 3(A)).

In addition, the first side wall 11b has a latch detection shaft through-hole 11s that allows a latch detection shaft 16c (illustrated in FIG. 8 and corresponding to a latch detection unit) of the slider 16 to pass therethrough. The first side wall 11b further has a first fixing hole 11t that allows one end of the slider guide shaft 17 to be fitted and fixed thereto. In addition, the second side wall 11c has a second fixing hole 11u that allows the other end of the slider guide shaft 17 to be fitted and fixed thereto. Still furthermore, the first base 11 has first and second screw through-grooves 11v and 11w formed therein so as to be adjacent to the first and second side walls 11b and 11c, respectively. The first and second screw through-grooves 11v and 11w allow the two assembling screws 21 to pass therethrough.

Figure 4A:
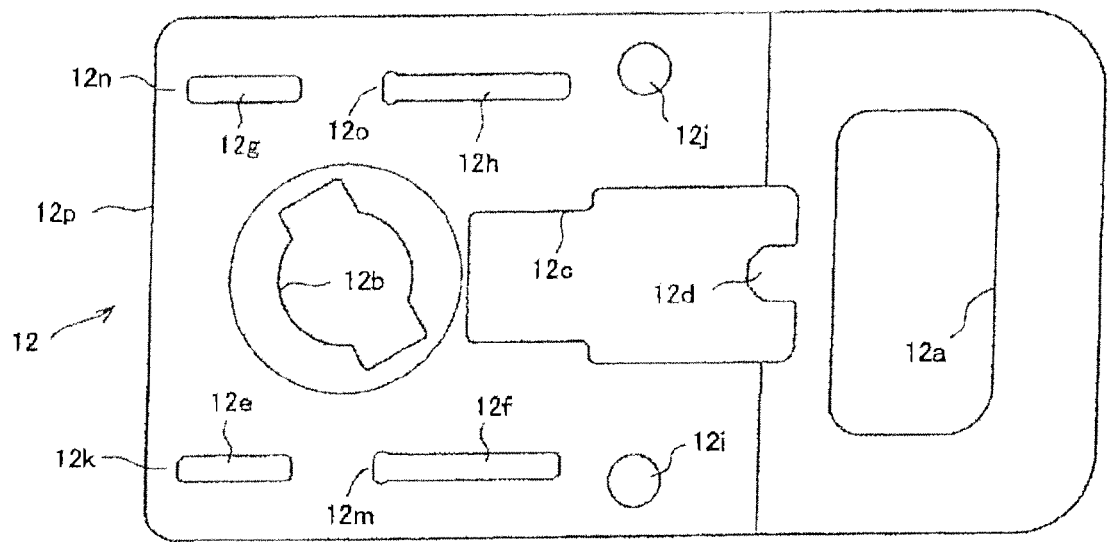
FIG. 4(A) is a top view of a second base.
Figure 4B:
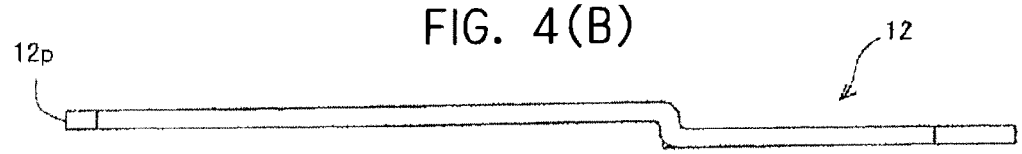
FIG. 4(B) is a front view of the second base.
Figure 4C:
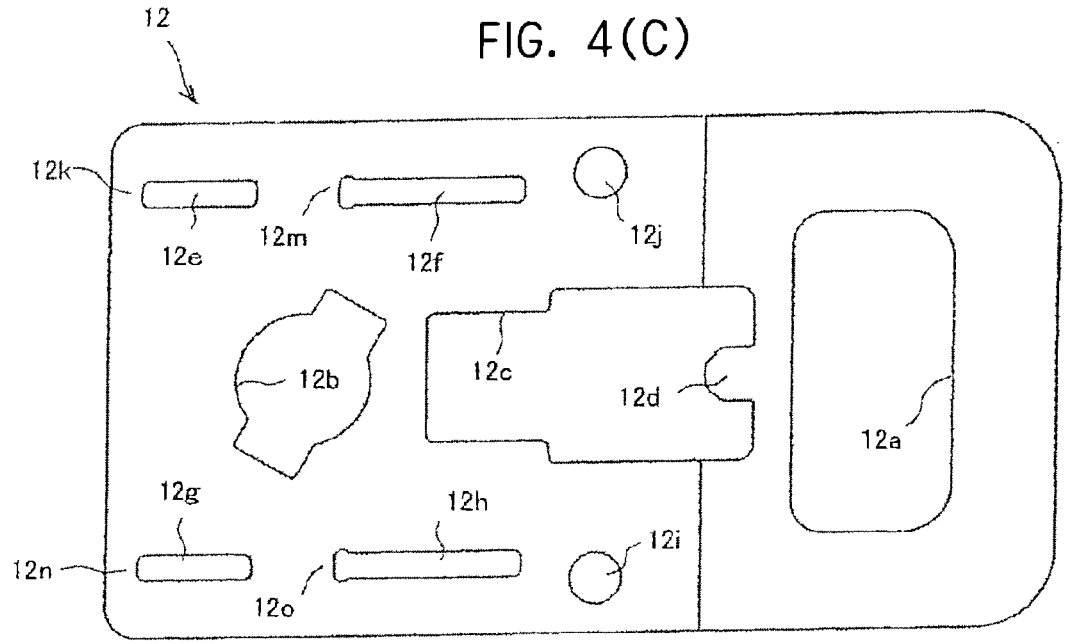
FIG. 4(C) is a bottom view of the second base.

FIG. 4(A) is a top view of the second base. FIG. 4(B) is a front view of the second base. FIG. 4(C) is a bottom view of the second base.

As illustrated in FIGS. 4(A) to 4(C), the second base 12 is formed so as to have a plate shape. The second base 12 includes a seat belt through-hole 12a that allows the seat belt 4 to pass therethrough, a latch member insertion hole 12b that allows the buckle latch member 13 to be inserted thereinto, an ejector guide hole 12c that leads the ejector 14, an ejector spring support portion 12d that supports an end of the ejector spring 15, first and second fitting holes 12e and 12f each having an elongated rectangular shape and being fitted into the first and second engagement fixing portions 11i and 11j of the first base 11, respectively, third and fourth fitting holes 12g and 12h each having an elongated rectangular shape and being fitted into the third and fourth engagement fixing portions 11o and 11p of the first base 11, respectively, and first and second screw through-holes 12i and 12j that allow the two assembling screws 21 to pass therethrough.

The first to fourth fitting holes 12e, 12f, 12g, and 12h of the second base 12 are fitted to the first to fourth engagement fixing portions 11i, 11j, 11o, and 11p of the first base 11, respectively. Thereafter, the second base 12 is moved in a direction in which the seat belt locking tongue 6 is inserted with respect to the first base 11 (the right direction in FIG. 3(A)). Thus, first to fourth engagement portions 12k, 12m, 12n, and 12o located adjacent the left sides of the first to fourth fitting holes 12e, 12f, 12g, and 12h of the second base 12 in FIG. 4(A) are fitted into the corresponding first to fourth engagement support grooves 11k, 11m, 11q, and 11r of the first base 11, respectively. In such a case, by inserting the two assembling screws 21 through the first and second screw through-holes 12i and 12j of the second base 12 and the first and second screw through-grooves 11v and 11w of the first base 11, a substantive movement of the second base 12 relative to the first base 11 can be prevented. In this manner, slipping-out of the first to fourth engagement portions 12k, 12m, 12n, and 12o from the second base 12 from the first to fourth engagement support grooves 11k, 11m, 11q, and 11r of the first base 11, respectively, can be prevented. Thus, the second base 12 is firmly assembled to the first base 11.

Figure 5A:
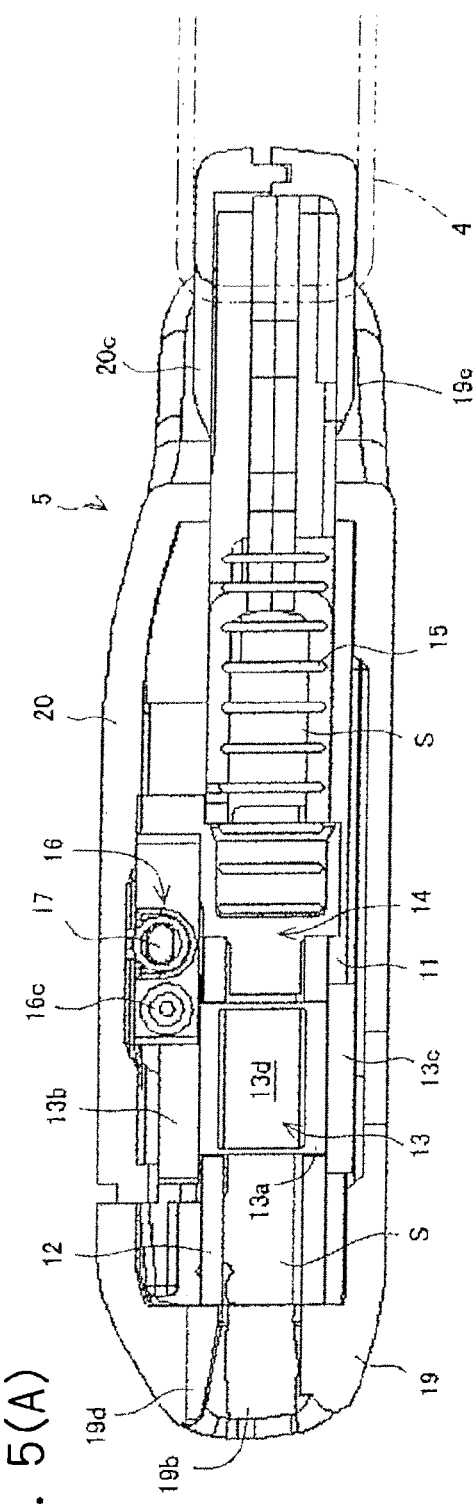
FIG. 5(A) is a longitudinal cross-sectional view of the seat belt locking buckle according to the embodiment.

When the second base 12 is assembled to the first base 11, a space S having a rectangular shape in lateral cross section is formed between the first base 11 and the second base 12, as illustrated in FIG. 5(A). In addition, the seat belt through-hole 11d of the first base 11 is aligned with the seat belt through-hole 12a of the second base 12. The latch member insertion hole 11e of the first base 11 is aligned with the latch member insertion hole 12b of the second base 12. Furthermore, the ejector guide hole 11f of the first base 11 is substantially aligned with the ejector guide hole 12c of the second base 12. Still furthermore, the ejector spring support portion 11g of the first base 11 is aligned with the ejector spring support portion 12d of the second base 12.

Figure 6B:
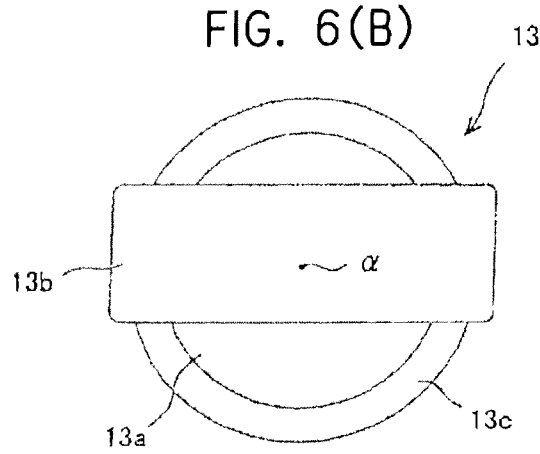
FIG. 6(B) is a top view of the buckle latch member.
Figure 6A:
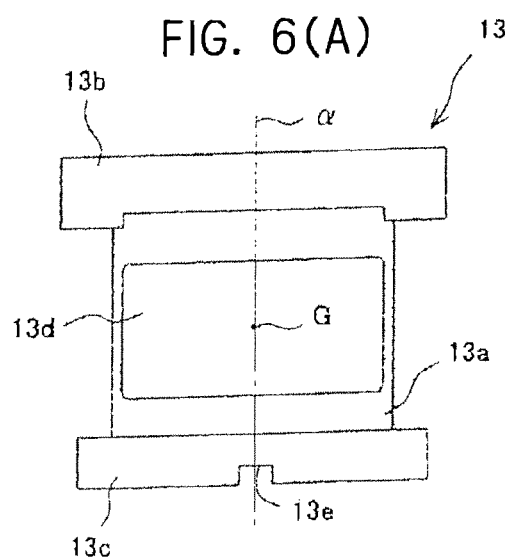
FIG. 6(A) is a front view of a buckle latch member.
Figure 6D:
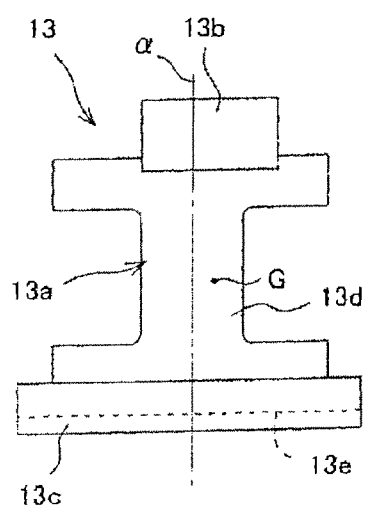
FIG. 6(D) is a right side view of the buckle latch member.
Figure 6C:
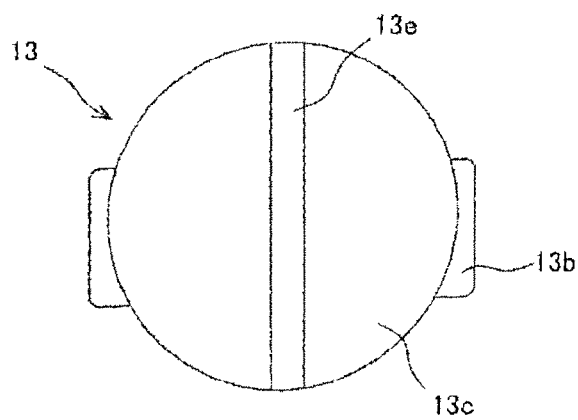
FIG. 6(C) is a bottom view of the buckle latch member.

FIG. 6(A) is a front view of a buckle latch member. FIG. 6(B) is a top view of the buckle latch member. FIG. 6(C) is a bottom view of the buckle latch member. FIG. 6(D) is a right side view of the buckle latch member.

As illustrated in FIGS. 6(A) to 6(D), the buckle latch member 13 is formed in a substantially solid cylindrical shape. In addition, the buckle latch member 13 is supported by the first base 11 and the second base 12 so as to be rotatable about a rotation axis a of the buckle latch member 13 between a non-latch position (illustrated in FIG. 12) and a latch position (illustrated in FIG. 16(A)). The rotation axis α is perpendicular to a plane of the motion of a tongue latch member 6b of the seat belt locking tongue 6 in the seat belt locking buckle 5. The buckle latch member 13 includes a buckle latch portion 13a having a cylindrical shape and formed in the middle thereof, a first latch guide portion 13b having an elongated rectangular parallelepiped shape and formed at one end of the buckle latch portion 13a (the top end in FIG. 6(A)) and a second latch guide portion 13c having a disk shape and formed at the other end of the buckle latch portion 13a (the lower end in FIG. 6(A)).

A circular curved side surface of the buckle latch portion 13a has a seat belt locking tongue passage enabling groove 13d (corresponding to a tongue latch member wrong insertion prevention portion insertion permitting portion) formed from a pair of flat planes that are parallel or substantially parallel to each other. The seat belt locking tongue passage enabling groove 13d extends along the length direction of the first latch guide portion 13b. The thickness of the seat belt locking tongue passage enabling groove 13d (the length in the right-left direction in FIG. 6(D)) is set to much smaller than the diameter of the circular shape of the buckle latch portion 13a. In contrast, the length of the first latch guide portion 13b is set to larger than the circular shape of the buckle latch portion 13a. Furthermore, the lower surface of the second latch guide portion 13c has a latch releasing groove 13e formed in a linear fashion. The central axis of the buckle latch portion 13a is coaxial with the center of the second latch guide portion 13c. The center of the first latch guide portion 13b is slightly offset from the central axis of the buckle latch portion 13a. In such a case, the central axis of the buckle latch portion 13a is coaxial with the rotation axis a of the buckle latch member 13. Accordingly, a center of gravity G of the buckle latch member 13 is significantly close to the rotation axis α of the buckle latch member 13.

The shape of each of the latch member insertion hole 11e of the first base 11 and the latch member insertion hole 12b of the first base 12 is similar to a planar shape of a plane formed by the first latch guide portion 13b and the buckle latch portion 13a illustrated in FIG. 6(B), and the size of the shape is slightly larger than the planar shape. In such a case, the diameter of a circular arc portion of each of the latch member insertion holes 11e and 12b is set to smaller than the length of the first latch guide portion 13b. Accordingly, the first latch guide portion 13b and the buckle latch portion 13a can pass through each of the latch member insertion holes 11e and 12b. In addition, if the buckle latch member 13 is rotated after the first latch guide portion 13b passes through each of the latch member insertion holes 11e and 12b, the first latch guide portion 13b cannot pass through each of the latch member insertion holes 11e and 12b. Furthermore, the second latch guide portion 13c is formed so that the diameter of the circular shape thereof is larger than each of the sizes of the latch member insertion hole 11e of the first base 11 and the latch member insertion hole 12b of the second base 12. Thus, the second latch guide portion 13c cannot pass through each of the latch member insertion holes 11e and 12b.

The planar shape formed by the first latch guide portion 13b and the buckle latch portion 13a is aligned with the shape of each of the latch member insertion holes 11e and 12b. Thereafter, the first latch guide portion 13b and the buckle latch portion 13a pass through the latch member insertion hole 11e of the first base 11 and the latch member insertion hole 12b of the second base 12 from the outer side of the first base 11. Subsequently, by rotating the buckle latch member 13, the buckle latch member 13 can be relatively rotatably assembled to the assembled first and second bases 11 and 12, as illustrated in FIG. 5(A). In such a case, the first latch guide portion 13b is located outside of the second base 12 (above the second base 12 in FIG. 5(A)). In addition, the second latch guide portion 13c is located outside of the first base 11 (under the first base 11 in FIG. 5(A)). Furthermore, at least a portion of the buckle latch portion 13a having the seat belt locking tongue passage enabling groove 13d formed therein is located in the space S between the first base 11 and the second base 12. In this manner, the buckle latch member 13 cannot be removed from the first base 11 and the second base 12 unless the planar shape formed from the first latch guide portion 13b and the buckle latch portion 13a is aligned with the shape of each of the latch member insertion holes 11e and 12b.

Figure 7B:
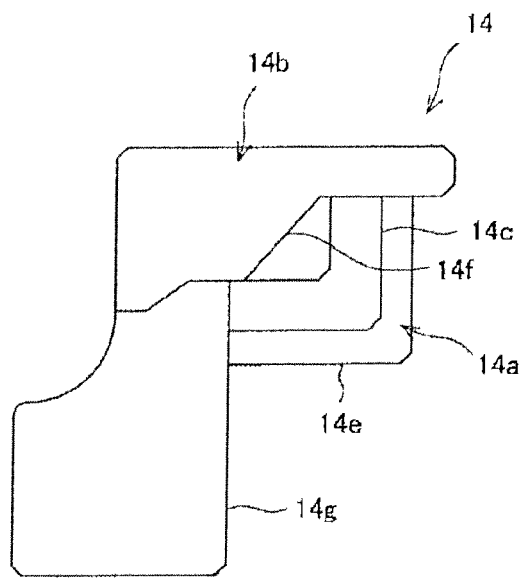
FIG. 7(B) is a top view of the ejector.
Figure 7A:
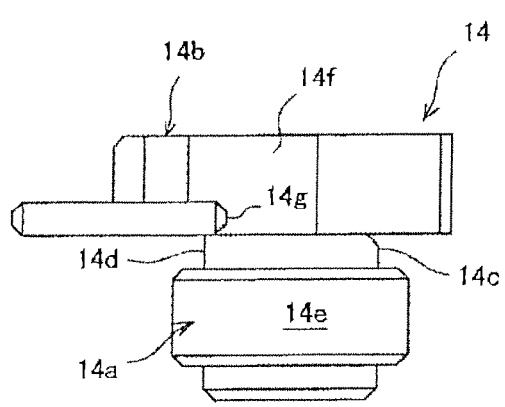
FIG. 7(A) is a front view of an ejector.
Figure 7C:
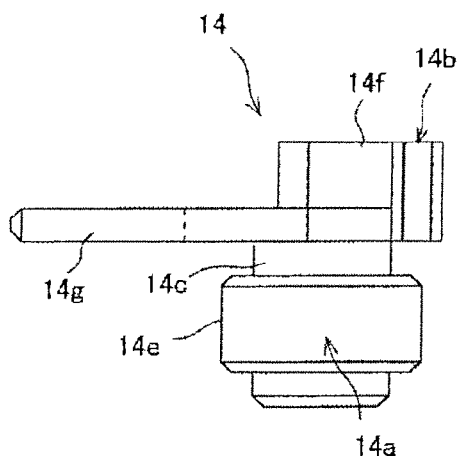
FIG. 7(C) is a right side view of the ejector.

FIG. 7(A) is a front view of the ejector. FIG. 7(B) is a top view of the ejector. FIG. 7(C) is a right side view of the ejector.

The ejector 14 serves as a latch member rotation control member. As illustrated in FIGS. 7(A) to 7(C), the ejector 14 includes an ejector body 14a having a rectangular parallelepiped shape, a latch member/slider control portion 14b disposed above the ejector body 14a in FIG. 7(A), and a pair consisting of a first ejector guide surface 14c and a second ejector guide surface 14d disposed between the ejector body 14a and the latch member/slider control portion 14b. In addition, the ejector body 14a has a seat belt fixing contact surface 14e with which the seat belt locking tongue 6 is in contact.

The ejector body 14a is disposed in large-width portions of the ejector guide hole 11f of the first base 11 and the ejector guide hole 12c of the second base 12. In contrast, the first ejector guide surface 14c and the second ejector guide surface 14d are disposed in a small-width portion of the ejector guide hole 12c of the second base 12 so as to be fitted to both edges of the small-width portion of the ejector guide hole 12c slidably in the length direction of the ejector guide hole 12c.

The ejector 14 is disposed so as to be movable in a direction in which the seat belt locking tongue 6 is inserted or ejected while the ejector body 14a of the ejector 14 is being led by the large-width portions of the ejector guide hole 11f and the ejector guide hole 12c and the first ejector guide surface 14c and the second ejector guide surface 14d are being led by the edges on both sides of the small-width portion of the ejector guide hole 12c of the second base 12. In addition, since the first ejector guide surface 14c and the second ejector guide surface 14d are fitted into the edges on both side of the small-width portion of the ejector guide hole 12c of the second base 12, the ejector 14 is supported in a direction that is perpendicular to the second base 12 (the up-down direction in FIG. 5(A)).

Furthermore, the ejector 14 is urged in a direction in which the seat belt locking tongue 6 is ejected by the compressed ejector spring 15 loaded between the ejector spring support portion 11g of the first base 11 and the ejector spring support portion 12d of the second base 12 at all times.

The latch member/slider control portion 14b is disposed outside of the second base 12 (above the second base 12 in FIG. 5(A)). The latch member/slider control portion 14b includes a slider control portion 14f tilted at a predetermined angle (about 45 degrees in the example illustrated in the drawing) with respect to the direction in which the seat belt locking tongue 6 is inserted or ejected (the up-down direction in FIG. 7(B)). The latch member/slider control portion 14b further includes a latch member rotation prevention portion 14g extending in a direction in which the ejector 14 moves.

Figure 8C:
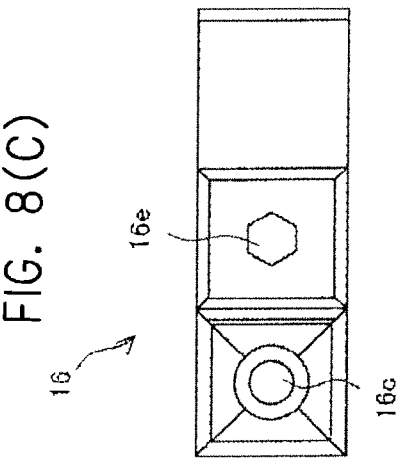
FIG. 8(C) is a right side view of the slider.
Figure 8B:
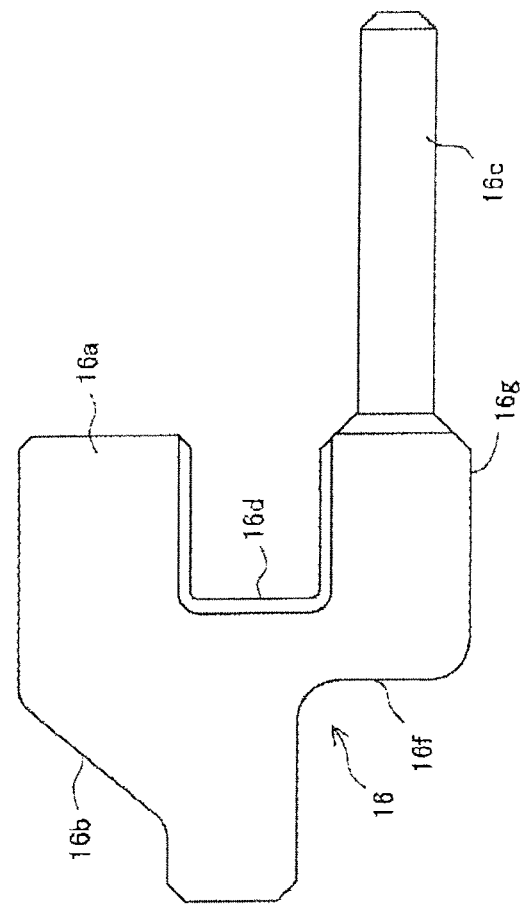
FIG. 8(B) is a top view of the slider.
Figure 8A:
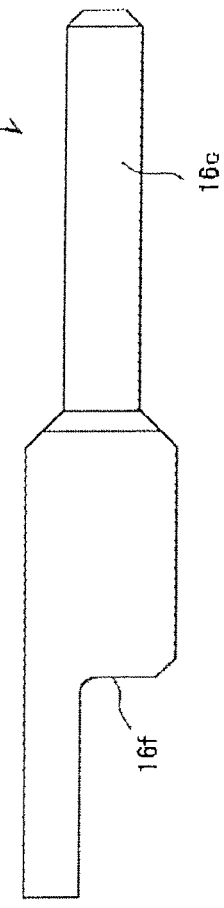
FIG. 8(A) is a front view of a slider.

FIG. 8(A) is a front view of the slider. FIG. 8(B) is a top view of the slider. FIG. 8(C) is a right side view of the slider.

The slider 16 serves as a latch-member operating member. As illustrated in FIGS. 8(A) to 8(C), the slider 16 includes a slider body 16a, a controlled surface 16b, a latch detection shaft 16c having a cylindrical shape, a slider spring support portion 16d, a slider guide shaft through-hole 16e, a latch member pressing portion 16f, and a latch member rotation prevention portion 16g. Both sides of the slider body 16a are fitted into and fixed to the first fixing hole 11t of the first side wall 11b and the second fixing hole 11u of the second side wall 11c of the first base 11. Thus, the slider body 16a is movably supported by the slider guide shaft 17 disposed between the first and second side walls 11b and 11c. In such a case, the slider guide shaft 17 is disposed so as to extend in a direction that is perpendicular or substantially perpendicular to the direction in which the seat belt locking tongue 6 is inserted into or ejected from the seat belt locking buckle 5. Accordingly, the slider guide shaft 17 is supported so as to be movable along the slider guide shaft 17. In such a case, the slider guide shaft 17 is disposed along a plane that is parallel or substantially parallel to a plane of the motion of the seat belt locking tongue 6 when the seat belt locking tongue 6 is inserted into or ejected from the seat belt locking buckle 5. Accordingly, the slider 16 moves along a plane that is parallel or substantially parallel to the plane in which the slider guide shaft 17 is disposed.

The controlled surface 16b is provided on the slider 16 at an inclination angle that is the same or substantially the same as that of the slider control portion 14f of the ejector 14. In addition, the controlled surface 16b can be in contact with the slider control portion 14f of the ejector 14. When the seat belt locking buckle 5 is not latched by the seat belt locking tongue 6, the controlled surface 16b of the slider 16 is in contact with the slider control portion 14f of the ejector 14. In this manner, the latch member pressing portion 16f of the slider 16 is not in contact with the first latch guide portion 13b of the buckle latch member 13. Thus, when the seat belt locking buckle 5 is not latched by the seat belt locking tongue 6, a biasing force of the slider spring is not exerted on the buckle latch member 13. In addition, the latch detection shaft 16c can slidably pass through the latch detection shaft through-hole 11s of the first base 11.

Furthermore, the slider spring support portion 16d supports the slider spring 18 loaded between the slider spring support portion 16d and the first side wall 11b of the first base 11 and is urged by the biasing force of the slider spring 18 at all times. The slider spring 18 is also disposed along a plane that is parallel or substantially parallel to the plane of the motion of the seat belt locking tongue 6. Accordingly, the slider 16 is urged by the slider spring 18 along the plane that is parallel or substantially parallel to the plane of the motion of the seat belt locking tongue 6.

FIG. 9(A) is a front view of the first and second covers. FIG. 9(B) is a bottom view of the first and second covers. FIG. 9(C) is a left side view of the first and second covers. FIG. 9(D) is a front view of a latch member rotating tool for rotating the latch member. FIG. 9(E) is a bottom view of the latch member rotating tool. FIG. 9(F) is a front view of a slider moving tool for moving the slider. FIG. 9(G) is a bottom view of the slider moving tool. Note that in FIGS. 9(A) to 9(C), the first cover is mated with the second cover.

As illustrated in FIGS. 9(A) to 9(C), each of the first cover 19 and the second cover 20 are formed of a synthetic resin. The first cover 19 has a latch releasing hole 19a for unlatching the seat belt locking buckle 5 from the seat belt locking tongue 6. In such a case, the latch releasing hole 19a is disposed at a position facing the latch releasing groove 13e of the buckle latch member 13. Therefore, the latch releasing groove 13e of the buckle latch member 13 is visible through the latch releasing hole 19a. When the buckle latch member 13 is rotatable, a groove engagement portion 23a of a latch member rotating tool 23 illustrated in FIGS. 9(D) and 9(E) is engaged with the latch releasing groove 13e through the latch releasing hole 19a. Thereafter, the latch member rotating tool 23 is rotated. Thus, the buckle latch member 13 is rotated.

In addition, as illustrated in FIG. 9(C), the left end of the first cover 19 illustrated in FIGS. 9(A) and 9(B) has a seat belt locking tongue insertion port 19b formed therein. The seat belt locking tongue insertion port 19b has a substantially rectangular shape and allows the tongue latch member 6b of the seat belt locking tongue 6 to be inserted into the seat belt locking buckle 5. In addition, a tongue-latch-portion guide portion 19c is formed in the middle of one side edge of the seat belt locking tongue insertion port 19b that extends in the length direction. When the tongue latch member 6b of the seat belt locking tongue 6 is inserted into the seat belt locking buckle 5, the tongue-latch-portion guide portion 19c leads the tongue latch member 6b. Furthermore, a tongue insertion prevention portion passage permitting groove 19d (corresponding to a tongue latch member wrong insertion prevention portion insertion permitting portion) is formed in the middle of the other side edge of the seat belt locking tongue insertion port 19b that extends in the length direction. The tongue insertion prevention portion passage permitting groove 19d has a circular arc shape in lateral cross section. When the tongue latch member 6b of the seat belt locking tongue 6 is inserted into the seat belt locking buckle 5 under a normal condition, the tongue insertion prevention portion passage permitting groove 19d allows a tongue insertion regulation portion 6g provided in the tongue latch member 6b (illustrated below in FIGS. 10(A) to 10(C) and corresponding to the tongue latch member wrong insertion prevention portion) to pass through the seat belt locking tongue insertion port 19b. Still furthermore, a thin-wall portion 19e is formed at the end of the first cover 19 opposite to the end having the seat belt locking tongue insertion port 19b. The thin-wall portion 19e has a seat belt through-hole 19f formed therein. In addition, as illustrated in FIG. 2, female screw portions 19g and 19h are provided inside of the first cover 19. The female screw portions 19g and 19h allow the assembling screws 21 to be threadably mounted thereon.

In contrast, as illustrated in FIG. 9(A), the second cover 20 has an elongated linear slider movement hole 20a formed therein. The slider movement hole 20a allows the slider 16 located at a position at which the buckle latch member 13 is latched and held to move. In such a case, when the seat belt locking tongue 6 and the seat belt locking buckle 5 are latched together, the end of the slider 16 is visible through the slider movement hole 20a. As illustrated in FIGS. 9(F) and 9(G), a slider pressing portion 24a of a slider moving tool 24 is brought into contact with an end of the slider 16 through the slider movement hole 20a. Thereafter, by urging the slider moving tool 24 against the slider 16, the slider 16 can be moved toward a non-operating position.

The second cover 20 further has an assembling screw mounting holes 20b formed therein. The assembling screw mounting holes 20b allow the assembling screws 21 to pass therethrough. Still furthermore, the second cover 20 has a thin-wall portion 20c at one end thereof. The thin-wall portion 20c has a seat belt through-hole 20d formed therein. In such a case, when the seat belt locking buckle 5 is assembled, the seat belt through-hole 11d of the first base 11, the seat belt through-hole 12a of the second base 12, the seat belt through-hole 19f of the first cover 19, and the seat belt through-hole 20d of the second cover 20 are at least partially aligned with one another. When, as indicated by an alternate long and two short dashes line in FIG. 5(A), the seat belt 4 is inserted into the seat belt through-holes 19f and 20d and is folded back, the thickness of the folded-back portion of the seat belt 4 is less than or substantially equal to the thickness of the assembled first cover 19 and second cover 20 due to the presence of the thin-wall portion 19e of the first cover 19 and the thin-wall portion 20e of the second cover 20. Thus, a connection portion of the seat belt 4 and the seat belt locking buckle 5 is compact and not bulky. As a result, the seat belt locking buckle 5 connected to the seat belt 4 can be easily handled.

Figure 10C:
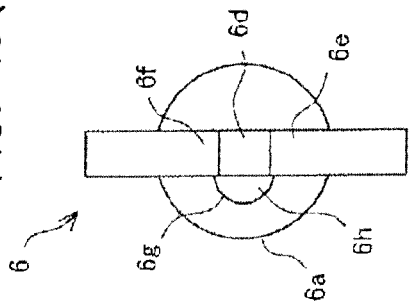
FIG. 10(C) is a right side view of the seat belt locking tongue.
Figure 10A:
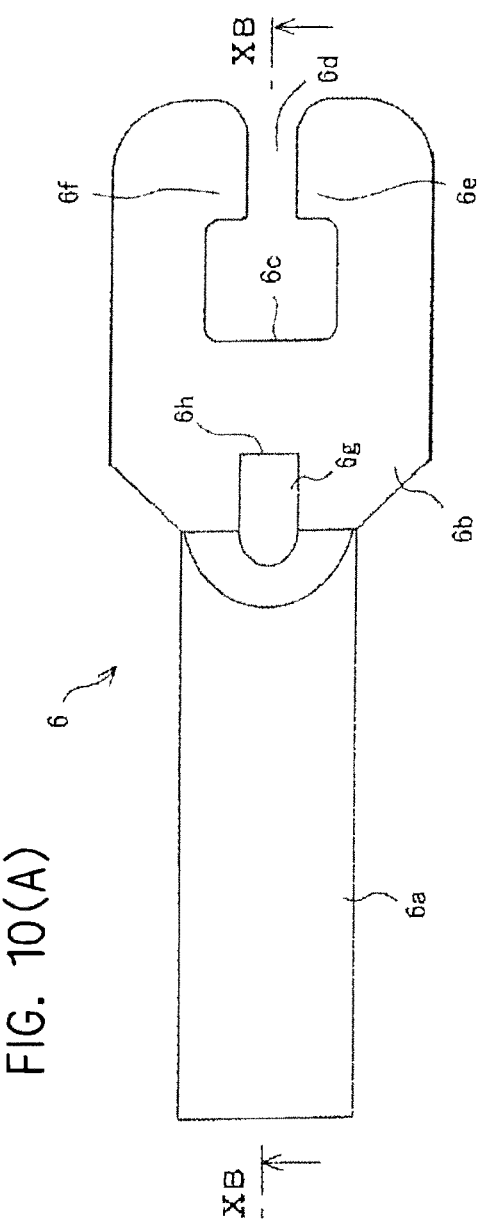
FIG. 10(A) is a plan view of a seat belt locking tongue.
Figure 10B:
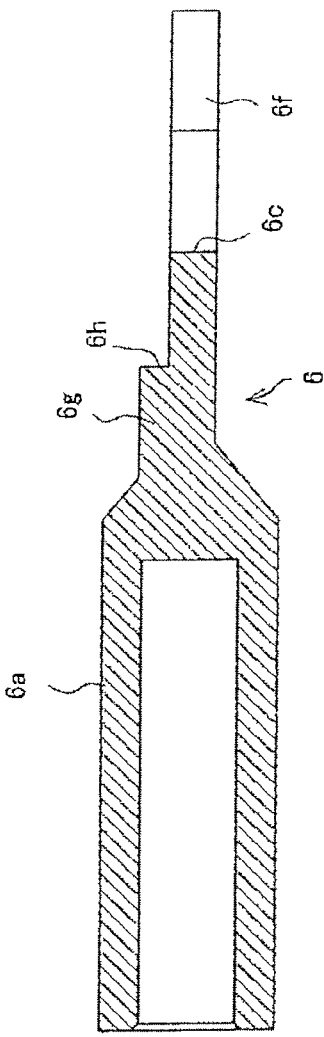
FIG. 10(B) is a cross-sectional view taken along a line XB-XB of FIG. 10(A)

FIG. 10(A) is a plan view of the seat belt locking tongue. FIG. 10(B) is a cross-sectional view taken along a line XB-XB of FIG. 10(A). FIG. 10(C) is a right side view of the seat belt locking tongue.

As illustrated in FIGS. 10(A) to 10(C), the seat belt locking tongue 6 is formed of a metal material. The seat belt locking tongue 6 includes a fixing portion 6a to be fixed to a pretensioner fixed to the vehicle body and a tongue latch member 6b. The fixing portion 6a has a bottomed cylindrical shape. In contrast, the tongue latch member 6b is formed so as to be integrated into the fixing portion 6a in a substantially rectangular plate shape. The tongue latch member 6b can be partially inserted into the space S formed between the first base 11 and the second base 12 through the seat belt locking tongue insertion port 19b of the first cover 19.

The tongue latch member 6b has a substantially square hole 6c formed in the substantially middle thereof and an open passage 6d that allows the hole 6c to communicate with the outside of the tongue latch member 6b. The length of a side of the square hole 6c is slightly larger than the diameter of the cylindrical portion of the buckle latch portion 13a. In addition, the width of the open passage 6d is slightly larger than the width of the seat belt locking tongue passage enabling groove 13d and is slightly smaller than the diameter of the cylindrical portion of the buckle latch portion 13a. Accordingly, the seat belt locking tongue passage enabling groove 13d of the buckle latch portion 13a can pass through the open passage 6d. However, the cylindrical portion of the buckle latch portion 13a cannot pass through the open passage 6d. That is, a portion of the tongue latch member 6b having the open passage 6d formed therein serves as a first tongue latch portion 6e and a second tongue latch portion 6f that extend in a direction perpendicular or substantially perpendicular to the direction in which the seat belt locking tongue 6 is inserted and that can be engaged with the cylindrical portion of the buckle latch portion 13a.

In addition, the tongue latch member 6b has a tongue insertion regulation portion 6g formed therein. The tongue insertion regulation portion 6g regulates the length of a portion of the tongue latch member 6b that is inserted into the seat belt locking buckle 5 to a predetermined length. The predetermined length used to regulate the length of a portion of the tongue latch member 6b that is inserted is set to a value that causes the tongue latch member 6b of the seat belt locking tongue 6 to be stably latched by the buckle latch portion 13a of the buckle latch member 13. In this manner, an excessive length of a portion of the tongue latch member 6b that is inserted into the seat belt locking buckle 5 is avoid. In addition, through the regulation of the length of the portion that is inserted, an operator can easily and stably perform the latch operation of the seat belt locking buckle 5 with the seat belt locking tongue 6. The tongue insertion regulation portion 6g is formed in a circular arc shape in lateral cross section and extends in a direction in which the seat belt locking tongue 6 is inserted into the seat belt locking buckle 5. In such a case, the circular arc shape of the tongue insertion regulation portion 6g is slightly smaller than the tongue insertion prevention portion passage permitting groove 19d and, therefore, the tongue insertion regulation portion 6g can pass through the tongue insertion prevention portion passage permitting groove 19d.

Note that the seat belt locking buckle 5 of the present embodiment allows an operator to visually check whether the seat belt locking buckle 5 is properly latched by the seat belt locking tongue 6.

FIG. 11 illustrates visual check as to whether the seat belt locking buckle is properly latched by the seat belt locking tongue. FIG. 11(A) is a perspective view of the seat belt locking buckle that is not latched by the seat belt locking tongue. FIG. 11(B) is a cross-sectional view taken along a line XIB-XIB of FIG. 11(A). FIG. 11(C) is a perspective view of the seat belt locking buckle that is properly latched by the seat belt locking tongue. FIG. 11(D) is a cross-sectional view taken along a line XID-XID of FIG. 11(C).

As illustrated in FIGS. 11(A) to 11(D), the second cover 20 has a latch detection shaft through-hole 20e formed therein. The latch detection shaft through-hole 20e allows the latch detection shaft 16c of the slider 16 that has passed through the latch detection shaft through-hole 11s of the first side wall 11b of the first cover 19 to pass therethrough in a slidable manner.

In addition, as illustrated in FIGS. 11(A) and 11(B), when the seat belt locking buckle 5 is not latched by the seat belt locking tongue 6, the latch detection shaft 16c passes through the latch detection shaft through-hole 20e and protrudes to the outside of the second cover 20. Accordingly, the operator can recognize that the seat belt locking buckle 5 is not latched by the seat belt locking tongue 6 if the operator views the latch detection shaft 16c protruding from the second cover 20. In addition, as illustrated in FIGS. 11(C) and 11(D), if the seat belt locking buckle 5 is properly latched by the seat belt locking tongue 6, the latch detection shaft 16c is placed inside the second cover 20 and does not protrude to the outside of the second cover 20. Accordingly, the operator can recognize that the seat belt locking buckle 5 is properly latched by the seat belt locking tongue 6 if the operator does not see the latch detection shaft 16c that is placed inside the second cover 20.

The operation performed by the seat belt locking buckle 5 and the seat belt apparatus 1 having the above-described structure according to the present embodiment is described next.

Figure 12:
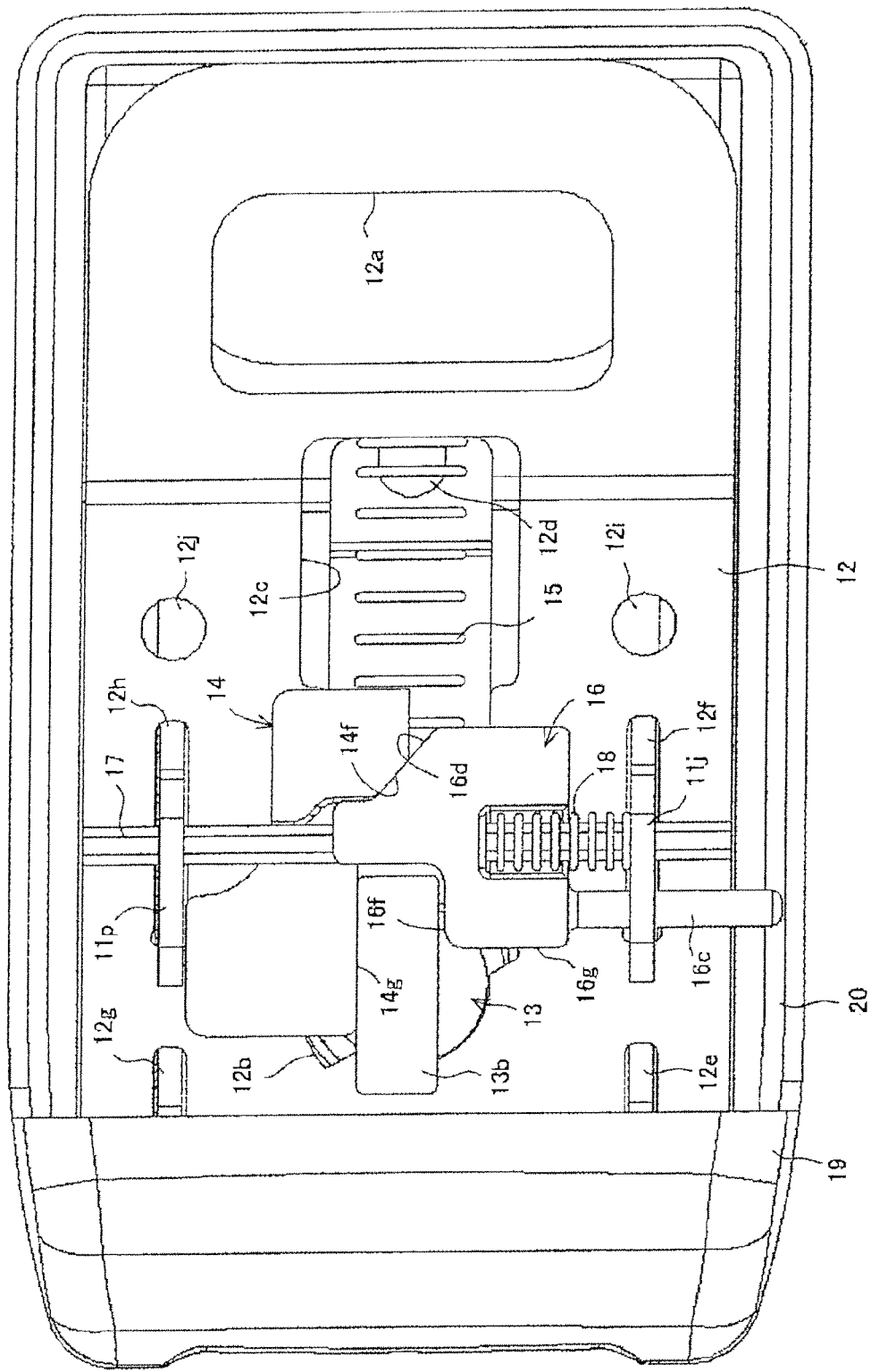
FIG. 12 is a partially cut-away top view of the seat belt locking buckle with the seat belt locking tongue unlatched.

As illustrated in FIG. 12, when the seat belt locking buckle 5 is not latched by the seat belt locking tongue 6, the ejector 14 is located at the operating position (the leftmost position in FIG. 12). At the operating position of the ejector 14, the latch member rotation prevention portion 14g is in contact with the side surface of the first latch guide portion 13b. Thus, the length direction of the first latch guide portion 13b is set to a direction in which the seat belt locking tongue 6 is inserted. Accordingly, the seat belt locking tongue passage enabling groove 13d is also oriented to that direction. In addition, at the operating position of the ejector 14, the controlled surface 16b of the slider 16 is in contact with the slider control portion 14f of the ejector 14. Thus, the slider 16 is set at a non-operating position illustrated in FIG. 12 (the lowermost position in FIG. 12). Note that the biasing forces of the ejector spring 15 and the slider spring 18 and the inclination angles of the slider control portion 14f and the controlled surface 16b are determined so that the ejector 14 can set the slider 16 at the non-operating position.

At the non-operating position of the slider 16, the latch member pressing portion 16f of the slider 16 is not in contact with the first latch guide portion 13b and is slightly separated from the first latch guide portion 13b. Accordingly, the biasing force of the slider spring 18 is not exerted on the first latch guide portion 13b. Consequently, the buckle latch member 13 is located at the non-latch position illustrated in FIG. 12. In addition, as illustrated in FIGS. 11(A) and 11(B) and FIG. 12, at the non-operating position of the slider 16, the latch detection shaft 16c protrudes from the second cover 20. Thus, the operator can see the latch detection shaft 16c that protrudes and, therefore, can recognize that the seat belt locking tongue 6 is latched by the seat belt locking buckle 5.

Figure 5B:
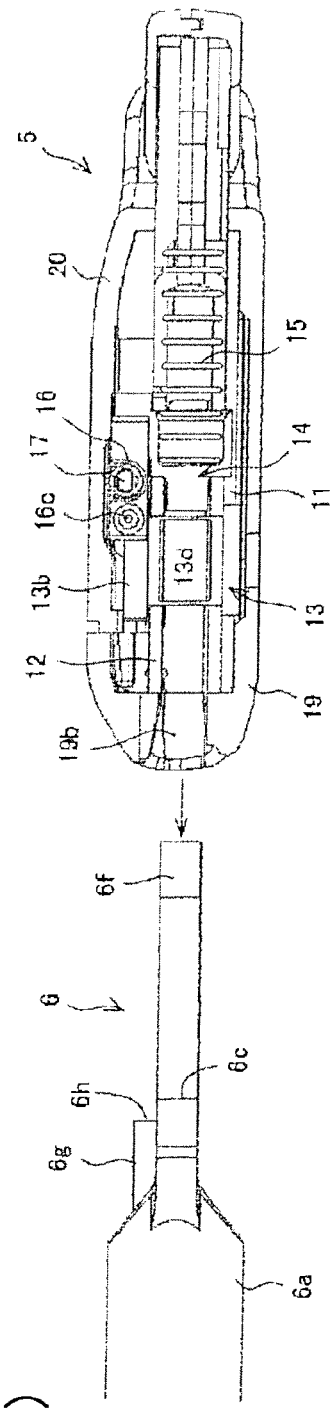
FIG. 5(B) is a longitudinal cross-sectional view of the seat belt locking buckle with the seat belt locking tongue unlatched.

As illustrated in FIG. 5(B), in order for the seat belt locking buckle 5 to be latched by the seat belt locking tongue 6, the seat belt locking buckle 5 is fitted into the tongue latch member 6b of the seat belt locking tongue 6 through the seat belt locking tongue insertion port 19b with a predetermined pressing force. At that time, the seat belt locking buckle 5 is fitted into the tongue latch member 6b under a normal condition, the tongue insertion prevention portion passage permitting groove 19d of the seat belt locking tongue insertion port 19b of the first cover 19 passes through the tongue insertion regulation portion 6g of the seat belt locking tongue 6. Accordingly, the seat belt locking buckle 5 is smoothly fitted into the tongue latch member 6b under a normal condition. In addition, since the tongue-latch-portion guide portion 19c passes through the open passage 6d of the tongue latch member 6b, the seat belt locking buckle 5 is more smoothly fitted. In this manner, the tongue latch member 6b of the seat belt locking tongue 6 can be more deeply inserted into the seat belt locking buckle 5.

In contrast, if the seat belt locking buckle 5 is turned over, that is, if the tongue insertion prevention portion passage permitting groove 19d of the seat belt locking tongue insertion port 19b of the first cover 19 is accidentally placed on the opposite side on which the tongue insertion prevention portion passage permitting groove 19d does not face the tongue insertion regulation portion 6g of the seat belt locking tongue 6, passes through the seat belt locking tongue insertion port 19b, and is fitted into the tongue latch member 6b, the seat belt locking tongue insertion port 19b of the seat belt locking buckle 5 is brought into contact with a top end 6h of the tongue insertion regulation portion 6g of the tongue latch member 6b, since the tongue insertion prevention portion passage permitting groove 19d is not present on the side of the tongue insertion regulation portion 6g. Accordingly, the seat belt locking buckle 5 cannot be further deeply fitted into the tongue latch member 6b. That is, the tongue latch member 6b of the seat belt locking tongue 6 cannot be inserted into the latch position in the seat belt locking buckle 5. In this manner, the seat belt locking buckle 5 is not latched by the seat belt locking tongue 6 by mistake. As a result, a twisted seat belt is not attached to the vehicle body.

When the tongue latch member 6b of the seat belt locking tongue 6 is inserted into the seat belt locking buckle 5, the seat belt locking tongue passage enabling groove 13d of the buckle latch portion 13a is located inside of the open passage 6d of the seat belt locking tongue 6. Accordingly, the tongue latch member 6b is inserted into the seat belt locking buckle 5 while passing through the buckle latch portion 13a.

Figure 13:
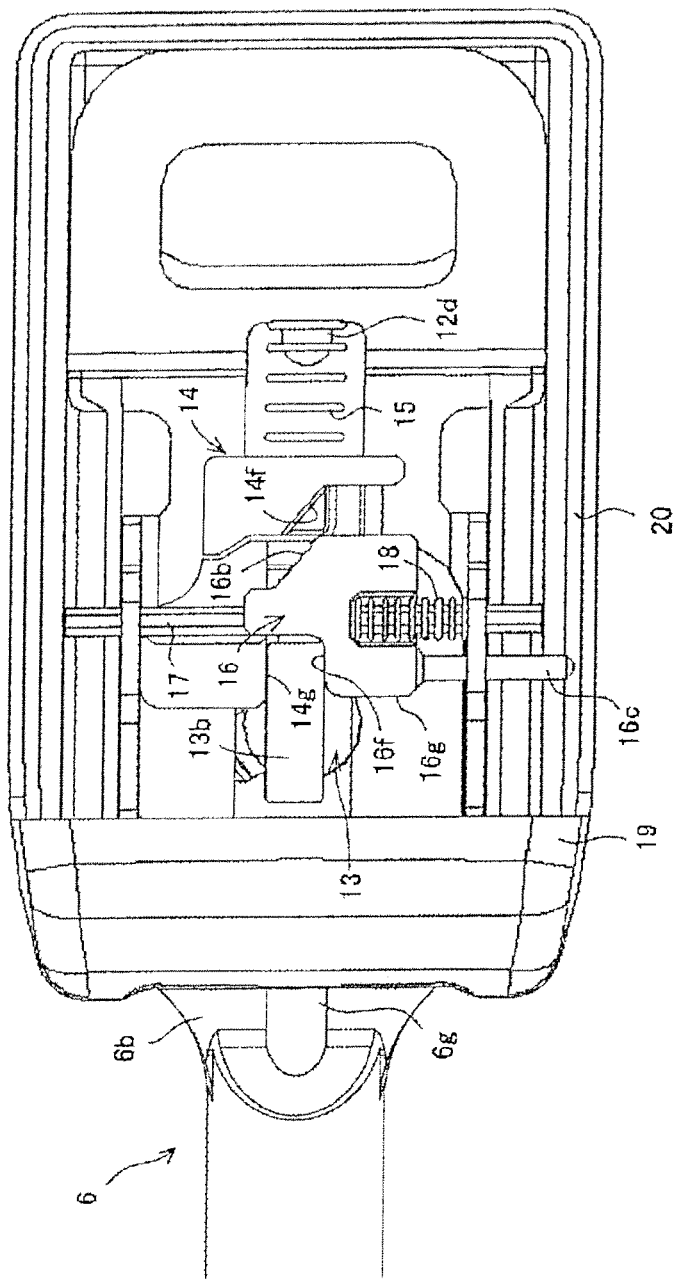
FIG. 13 is a partially cut-away top view of the seat belt locking buckle with the seat belt locking tongue partially inserted.

If the tongue latch member 6b of the seat belt locking tongue 6 is further inserted into the seat belt locking buckle 5, the top end of the tongue latch member 6b is brought into contact with the seat belt fixing contact surface 14e of the ejector 14 and pushes the ejector 14. Thus, as illustrated in FIG. 13, the ejector 14 moves in a direction in which the tongue latch member 6b moves (in the right direction in FIG. 13) together with the tongue latch member 6b. In this manner, the latch member rotation prevention portion 14g also moves in the same direction. At that time, the latch member rotation prevention portion 14g is still in contact with the side surface of the first latch guide portion 13b.

Since the ejector 14 moves, the slider control portion 14f of the ejector 14 is separated from the controlled surface 16b of the slider 16. Thus, as illustrated in FIG. 13, the slider 16 moves upward due to the biasing force of the slider spring 18, and the latch member pressing portion 16f of the slider 16 is brought into contact with an end portion of the side surface of the first latch guide portion 13b opposite the side surface with which the latch member rotation prevention portion 14g is brought into contact. In this manner, the biasing force of the slider spring 18 is exerted on the first latch guide portion 13b. However, since the latch member rotation prevention portion 14g is in contact with the side surface of the first latch guide portion 13b, the first latch guide portion 13b does not rotate even when the biasing force of the slider spring 18 is exerted on the first latch guide portion 13b. Accordingly, the buckle latch member 13 maintains its orientation in the non-latch state of the seat belt locking buckle 5, as illustrated in FIG. 12.

If the tongue latch member 6b is further deeply inserted into the seat belt locking buckle 5, the ejector 14 moves in the same direction as the tongue latch member 6b. Accordingly, as illustrated in FIG. 14(A), the latch member rotation prevention portion 14g of the ejector 14 is about to be separated from the side surface of the first latch guide portion 13b. That is, the buckle latch member 13 is about to start a latch operation. At that time, as illustrated in FIG. 14(B), the entirety of the buckle latch portion 13a of the buckle latch member 13 is located in the hole 6c of the tongue latch member 6b. In addition, the length direction of the seat belt locking tongue passage enabling groove 13d of the buckle latch portion 13a is set to a direction that is the same or substantially the same as the direction in which the tongue latch member 6b is inserted.

Thereafter, if the tongue latch member 6b is further deeply inserted into the seat belt locking buckle 5, the latch member rotation prevention portion 14g is separated from the side surface of the first latch guide portion 13b. Accordingly, as illustrated in FIG. 14(A), the first latch guide portion 13b is rotated in a counterclockwise direction due to the biasing force of the slider spring 18. That is, the buckle latch member 13 is rotated, in the same direction, about an axis that is perpendicular or substantially perpendicular to a plane of the motion of the tongue latch member 6b. At that time, since the buckle latch member 13 is supported by the first base 11 and the second base 12 so as to be only rotatable and, therefore, the buckle latch member 13 smoothly and efficiently rotates without any linear motion.

As illustrated in FIG. 15(A), if the tongue latch member 6b is further deeply inserted into the seat belt locking buckle 5, the top end 6h of the tongue insertion regulation portion 6g of the seat belt locking tongue 6 is brought into contact with a side end 12p (the left end in FIG. 15(A)) of the seat belt fixing tongue insertion port of the second base 12. Accordingly, insertion of the tongue latch member 6b into the seat belt locking buckle 5 is stopped, and the tongue latch member 6b is located at a full stroke position of the seat belt locking tongue 6. In addition, at the full stroke position of the seat belt locking tongue 6, movement of the slider 16 is stopped by a stopper (not illustrated), and the slider 16 is located at an operating position at which the slider 16 maximally moved, as illustrated in FIG. 15(A).

As illustrated in FIG. 15(A), at the operating position of the slider 16, the first latch guide portion 13b of the buckle latch member 13 rotates up to a position at which the first latch guide portion 13b is in contact with the latch member rotation prevention portion 16g of the slider 16 due to a force of inertia of rotation, and the first latch guide portion 13b is held at the rotational position. At the rotational position, the length direction of the first latch guide portion 13b is slightly inclined with respect to a direction in which the slider 16 moves. Accordingly, as illustrated in FIG. 15(B), like the first latch guide portion 13b, the seat belt locking tongue passage enabling groove 13d is slightly inclined with respect to the direction in which the slider 16 moves.

If a pressing force exerted on the seat belt locking buckle 5 for latching the seat belt locking tongue 6 is released after the seat belt locking tongue 6 makes a full stroke, the ejector 14 urges the tongue latch member 6b of the seat belt locking tongue 6 in a direction in which the tongue latch member 6b is ejected from the seat belt locking buckle 5 due to the biasing force of the ejector spring 15. Thus, the tongue latch member 6b is moved in that direction. At that time, since, as described above, the seat belt locking tongue passage enabling groove 13d is inclined, the first tongue latch portion 6e, which is one of two tongue latch portions of the tongue latch member 6b, is brought into contact with the side surface of the seat belt locking tongue passage enabling groove 13d due to the movement of the tongue latch member 6b. In this manner, the first tongue latch portion 6e pushes the seat belt locking tongue passage enabling groove 13d and rotates the buckle latch member 13 in a clockwise direction, as illustrated in FIGS. 15(A) and 15(B).

As illustrated in FIG. 16(B), due to the rotation of the buckle latch member 13, the side surface of the seat belt locking tongue passage enabling groove 13d is also brought into contact with the second tongue latch portion 6f, which is the other of two tongue latch portions of the tongue latch member 6b. Thus, rotation of the buckle latch member 13 is stopped, and the side surface of the seat belt locking tongue passage enabling groove 13d is brought into contact with both the first tongue latch portion 6e and the second tongue latch portion 6f. That is, the buckle latch member 13 is located at the latch position. In such a state of the seat belt locking tongue passage enabling groove 13d, the side surface of the seat belt locking tongue passage enabling groove 13d is parallel or substantially parallel to the direction in which the slider 16 moves. Accordingly, as illustrated in FIG. 16(A), the length direction of the first latch guide portion 13b is also parallel to or substantially parallel to the direction in which the slider 16 moves. Since the length direction of the first latch guide portion 13b is also parallel to or substantially parallel to the direction in which the slider 16 moves, the first base 11 and the second base 12 assembled together is sandwiched by the first latch guide portion 13b and the second latch guide portion 13c. In addition, the slider 16 is significantly close to the first latch guide portion 13b. Thus, when the buckle latch member 13 is located at the latch position illustrated in FIG. 16(A) and if the buckle latch member 13 is about to rotate, the first latch guide portion 13b is brought into contact with the slider 16. Accordingly, the slider 16 prevents (locks) rotation of the buckle latch member 13 from the latch position. In addition, the center of gravity G of the buckle latch member 13 is significantly close to the rotation axis a of the buckle latch member 13. Accordingly, if an external force is exerted on the buckle latch member 13 toward the non-latch position, the rotation torque of the buckle latch member 13 caused by the external force is small. Consequently, even when an external force is exerted on the buckle latch member 13 toward the non-latch position, rotation of the buckle latch member 13 toward the non-latch position is effectively prevented. Accordingly, when the buckle latch member 13 is located at the latch position, accidental rotation can be prevented.

Figure 5C:
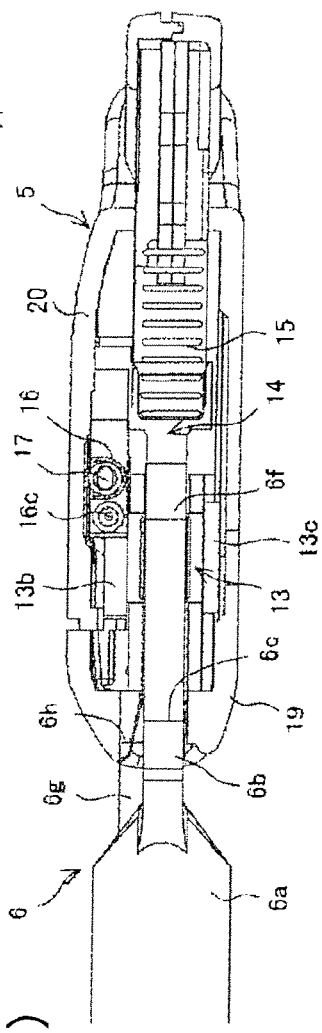
FIG. 5(C) is a longitudinal cross-sectional view of the seat belt locking buckle with the seat belt locking tongue latched.

In this manner, as illustrated in FIG. 5(C) and FIGS. 16(A) and 16(B), the first tongue latch portion 6e and the second tongue latch portion 6f are latched by the buckle latch portion 13a. Thus, the seat belt locking buckle 5 is properly latched by the seat belt locking tongue 6. Accordingly, the top end of the seat belt 4 is secured to the vehicle body. As illustrated in FIGS. 11(C) and 11(D) and FIG. 16(A), when the seat belt locking buckle 5 is properly latched by the seat belt locking tongue 6, the latch detection shaft 16c is disposed inside of the second cover 20 and does not protrude from the second cover 20. Accordingly, the operator does not see the latch detection shaft 16c and, thus, the operator can recognize that the seat belt locking tongue 6 is properly latched by the seat belt locking buckle 5.

When the seat belt locking buckle 5 is properly latched by the seat belt locking tongue 6 and if, in the event of emergency, a tension force that is larger than that in a normal case is exerted on the seat belt 4, each of the seat belt locking buckle 5 and the seat belt locking tongue 6 is pulled in a direction in which the seat belt locking buckle 5 is unlatched from the seat belt locking tongue 6. The end portions of the first base 11 and the second base 12 into which the tongue latch member 6b is inserted receives a force that attempts to spread the end portions apart. However, since the first to fourth engagement portion 12k, 12m, 12n, and 12o of the second base 12 are firmly fitted into and engaged with the corresponding first to fourth engagement support groove 11k, 11m, 11q, and 11r, respectively, spread of the first base 11 and the second base 12 is prevented even when a force to spread the first base 11 and the second base 12 apart is exerted thereon. In particular, since the first base 11 and the second base 12 are sandwiched by the first latch guide portion 13b and the second latch guide portion 13c, spread of the first base 11 and the second base 12 can be effectively prevented. That is, according to the present embodiment, the buckle latch member 13 reinforces the strength of the first base 11 and the second base 12.

In order to unlatch the seat belt locking buckle 5 and the seat belt locking tongue 6 latched together, the slider 16 is moved to the non-operating position by the slider pressing portion 24a of the slider moving tool 24, as described above. Thus, the buckle latch member 13 becomes rotatable. Thereafter, the buckle latch member 13 is rotated by the latch member rotating tool 23. Thus, as illustrated in FIG. 14(B), the seat belt locking tongue passage enabling groove 13d is disposed along a direction that is the same as the direction in which the tongue latch member 6b illustrated in FIG. 14(B) is ejected. Thereafter, the tongue latch member 6b is ejected from the seat belt locking buckle 5 by the ejector 14, and the seat belt locking buckle 5 is unlatched from the seat belt locking tongue 6. As described above, in order to unlatch the seat belt locking buckle 5 from the seat belt locking tongue 6, an operation for moving the slider 16 from both sides of the seat belt locking buckle 5 using the slider moving tool 24 and the latch member rotating tool 23 for unlatching and an operation for rotating the buckle latch member 13 need to be performed at the same time. In this manner, it is difficult for an ordinary user to easily unlatch the seat belt locking buckle 5 from the seat belt locking tongue 6 and, thus, the seat belt locking buckle 5 is unlatched from the seat belt locking tongue 6 by only a technician, such as a customer engineer.

According to the seat belt locking buckle 5 of the present embodiment, the buckle latch member 13 moves along a plane that is parallel or substantially parallel to a plane extending in a direction in which the tongue latch member 6b of the seat belt locking tongue 6 is inserted and ejected (that is, the direction in which the tongue latch member 6b moves). In addition, rotation of the buckle latch member 13 is controlled by the slider 16 that serves as a rotation control member. Accordingly, unlike existing seat belt locking buckles, the seat belt locking buckle 5 does not include a torsion spring that is disposed along the thickness direction of the seat belt locking buckle 5 and that urges the buckle latch member 13 in the rotational direction and, therefore, the thickness of the seat belt locking buckle 5 can be reduced. In addition, since the tongue latch member 6b is latched by the buckle latch member 13 having a substantially cylindrical shape, the buckle latch member 13 and the tongue latch member 6b can be stably and firmly latched together.

Furthermore, when the tongue latch member 6b is not inserted into the seat belt locking buckle 5, the slider 16 is separated from the buckle latch member 13 and, thus, the slider 16 does not push the buckle latch member 13. In this manner, when the buckle latch member 13 is assembled, the buckle latch member 13 is not pushed by the slider 16. Consequently, the buckle latch member 13 can be easily assembled.

Still furthermore, when the tongue latch member 6b is inserted into the seat belt locking buckle 5, the assembled first base 11 and second base 12 are sandwiched by the first latch guide portion 13b and the second latch guide portion 13c of the buckle latch member 13. Thus, even when, in the event of emergency, a tensional force that is greater than in a normal case is exerted on the seat belt 4 to spread the assembled first base 11 and second base 12 from each other, the first latch guide portion 13b and the second latch guide portion 13c can effectively prevent the spread of the first base 11 and the second base 12. That is, the strength of the assembled first base 11 and second base 12 can be reinforced by the buckle latch member 13.

Yet still furthermore, the latch detection shaft 16c is provided. When the seat belt locking tongue 6 is not latched by the seat belt locking buckle 5, the latch detection shaft 16c protrudes from the first cover 19 to the outside of the first cover 19. In contrast, when the seat belt locking tongue 6 is latched by the seat belt locking buckle 5, the latch detection shaft 16c is retracted into the first cover 19. Thus, by visually recognizing whether the first cover 19 protrudes to the outside of the first cover 19, the operator can determine whether the seat belt locking tongue 6 and the seat belt locking buckle 5 are latched together. In particular, by providing the latch detection shaft 16c in the slider 16, the structure for detecting a latch condition can be simplified.

In addition, the latch member rotation prevention portion 14g is formed from the ejector 14 that urges the tongue latch member 6b in the direction in which the tongue latch member 6b is ejected from the seat belt locking buckle 5. Accordingly, the structure for latching the seat belt locking buckle 5 can be simplified.

In addition, according to the present embodiment, the seat belt apparatus 1 includes the seat belt locking buckle 5 of the present embodiment capable of stably and firmly latching the seat belt locking tongue 6 and reducing the thickness of the seat belt apparatus 1. Thus, an occupant can be effectively restrained by using the seat belt 4. Furthermore, since a space occupied by the seat belt apparatus 1 is reduced, the seat belt apparatus 1 does not interfere with a motion of the occupant in a vehicle compartment.

In addition, the tongue insertion regulation portion 6g is provided. By using the tongue insertion regulation portion 6g, the length of a portion of the tongue latch member 6b inserted into the seat belt locking buckle 5 can be controlled to a predetermined length. Accordingly, the seat belt locking buckle 5 and the seat belt locking tongue 6 can be easily and stably latched together.

Furthermore, the tongue insertion regulation portion 6g is configured as a tongue latch member wrong insertion preventing portion. The tongue latch member wrong insertion preventing portion prevents the tongue latch member 6b from being accidentally turned over and inserted. In this manner, a twisted seat belt 4 cannot be buckled and, therefore, the occupant can be more reliably restrained by the seat belt 4. In addition, since the tongue latch member wrong insertion preventing portion is formed from the tongue insertion regulation portion 6g, the structure of the tongue latch member wrong insertion preventing portion can be simplified.

While the above-described embodiment has been described with reference to the seat belt locking buckle 5 provided at the top end of the seat belt 4 and the seat belt locking tongue 6 mounted on the vehicle body via the pretensioner 7, the seat belt locking buckle 5 may be mounted on the vehicle body via the pretensioner 7, and the seat belt locking tongue 6 may be provided at the top end of the seat belt 4. In addition, when each of the seat belt locking buckle 5 and the seat belt locking tongue 6 is mounted on the vehicle body, the seat belt locking buckle 5 or the seat belt 4 can be directly mounted on the vehicle body without using the pretensioner 7. That is, various design modifications can be made in the seat belt locking buckle within the scope of appended Claims.

The seat belt locking buckle and the seat belt apparatus can be suitably applied as a seat belt locking buckle for securing a top end of a seat belt that restrains an occupant in the event of emergency, such as collision, in which deceleration that is greater than that in a normal ease is applied to the vehicle and a seat belt apparatus including the seat belt locking buckle.

The priority application Japanese Patent Application No. 2011/273280, filed Dec. 14, 2011 including the specification, drawings, claims and abstract, is incorporated herein by reference in its entirety.

REFERENCE SIGNS LIST

1: seat belt apparatus
3: seat belt retractor
4: seat belt
5: seat belt locking buckle
6: seat belt locking tongue
6b: tongue latch member
6c: hole
6d: open passage
6e: first tongue latch portion
6f: second tongue latch portion
6g: tongue insertion regulation portion
7: pretensioner
9: tongue
10: buckle
11: first base
12: second base
13: buckle latch member
13a: buckle latch portion
13b: first latch guide portion
13c: second latch guide portion
13d: seat belt locking tongue passage enabling groove
13e: latch releasing groove
14: ejector
14b: latch member/slider control portion
14f: slider control portion
14g: latch member rotation prevention portion
16: slider
16b: controlled surface
16c: latch detection shaft
16f: latch member pressing portion
16g: latch member rotation prevention portion
19: first cover
19a: latch releasing hole
19b: seat belt locking tongue insertion port
19d: tongue insertion prevention portion passage permitting groove
19e: thin-wall portion
20: second cover
20a: slider movement hole
20e: latch detection shaft through-hole
23: latch member rotating tool
24: slider moving tool

What is claimed is:

1. A seat belt locking buckle directly or indirectly mounted on one of a seat belt and a vehicle body, the seat belt locking buckle securing a top end of the seat belt to the vehicle body by latching a seat belt locking tongue mounted directly or indirectly on the other of the seat belt and the vehicle body, the seat belt locking buckle comprising:
   a seat belt locking tongue insertion port that allows a tongue latch member of the seat belt locking tongue to be inserted into the seat belt locking buckle;
   a buckle latch member having a substantially solid cylindrical shape, the buckle latch member being disposed so as to be rotatable about an axis extending in a direction perpendicular or substantially perpendicular to a plane of the motion of the tongue latch member inserted into the seat belt locking buckle through the seat belt locking tongue insertion port at least between a non-latch position at which the tongue latch member is not latchable by the buckle latch member and a latch position at which the tongue latch member is latchable by the buckle latch member;
   a latch member rotation control member that disables rotation of the buckle latch member and holds the buckle latch member at the non-latch position when the tongue latch member is not inserted into the seat belt locking buckle and that enables rotation of the buckle latch member when moved by the tongue latch member inserted into the seat belt locking buckle along a plane parallel or substantially parallel to the plane of the motion of the tongue latch member; and
   a latch-member operating member that moves along a plane parallel or substantially parallel to the plane of the motion of the tongue latch member when the buckle latch member is rotatable and pushes the buckle latch member to rotate the buckle latch member from the non-latch position to the latch position.

2. The seat belt locking buckle according to claim 1,
   wherein the latch-member operating member is separated from the buckle latch member and does not push the buckle latch member when the tongue latch member is not inserted into the seat belt locking buckle, and
   wherein the latch-member operating member is in contact with the buckle latch member and pushes the buckle latch member when the latch member rotation control member is moved by the tongue latch member inserted into the seat belt locking buckle.

3. The seat belt locking buckle according to claim 1, further comprising:
a first base and a second base,
wherein the first base and the second base are assembled together so that a space that allows the tongue latch member inserted through the seat belt locking tongue insertion port to be inserted thereinto is formed between the first base and the second base, and
wherein the buckle latch member includes a first latch guide portion and a second latch guide portion by which the assembled first base and second base are sandwiched when the tongue latch member and the buckle latch member are latched together.

4. The seat belt locking buckle according to claim 3, wherein the latch-member operating member rotates the buckle latch member from the non-latch position to the latch position by coming into contact with the first latch guide portion and pushing the first latch guide portion.

5. The seat belt locking buckle according to claim 4,
wherein the latch member rotation control member does not allow the latch-member operating member to be in contact with the first latch guide portion when the tongue latch member is not inserted into the seat belt locking buckle, and
wherein the latch member rotation control member causes the latch-member operating member to be in contact with the first latch guide portion when the latch member rotation control member is moved by the tongue latch member.

6. The seat belt locking buckle according to claim 3, further comprising:
a cover that contains at least the buckle latch member, the latch member rotation control member, the latch-member operating member, the first base, and the second base, the cover having the seat belt locking tongue insertion port formed therein; and
a latch detection unit that protrudes from the cover to the outside of the cover when the seat belt locking tongue is not latched by the seat belt locking buckle and that retracts into the cover when the seat belt locking tongue is latched by the seat belt locking buckle.

7. The seat belt locking buckle according to claim 6, wherein the latch detection unit is disposed in the latch-member operating member.

8. The seat belt locking buckle according to claim 1, further comprising:
an ejector that urges the tongue latch member inserted into the seat belt locking buckle in a direction in which the tongue latch member is ejected from the seat belt locking buckle,
wherein the ejector serves as the latch member rotation control member.

9. A seat belt apparatus comprising:
a seat belt capable of restraining a vehicle occupant;
a seat belt retractor that retracts the seat belt therein;
a tongue slidably supported by the seat belt;
a buckle that allows the tongue to be inserted thereinto and engaged therewith;
a seat belt locking buckle directly or indirectly mounted on one of the seat belt and a vehicle body; and
a seat belt locking tongue directly or indirectly mounted on the other of the seat belt and the vehicle body, the seat belt locking tongue being latchable by the seat belt locking buckle,
wherein the seat belt locking buckle is the seat belt locking buckle according to claim 1.

10. The seat belt apparatus according to claim 9, wherein the tongue latch member includes a tongue insertion regulation portion that regulates the length of a portion of the tongue latch member that is inserted into the seat belt locking buckle to a predetermined length.

11. The seat belt apparatus according to claim 10, wherein the tongue insertion regulation portion further functions as a tongue latch member wrong insertion preventing portion that prevents the tongue latch member from being accidentally turned over and inserted.

12. The seat belt apparatus according to claim 9, wherein the tongue latch member includes a tongue latch member wrong insertion preventing portion that prevents the tongue latch member from being accidentally turned over and inserted.

13. The seat belt apparatus according to claim 12, wherein the seat belt locking buckle includes a tongue latch member wrong insertion prevention portion insertion permitting portion formed in the seat belt locking tongue insertion port, and the tongue latch member wrong insertion prevention portion insertion permitting portion allows the tongue latch member wrong insertion preventing portion to pass therethrough.

* * * * *